US010268567B2

(12) United States Patent
Marron

(10) Patent No.: US 10,268,567 B2
(45) Date of Patent: Apr. 23, 2019

(54) SYSTEMS, METHODS, AND COMPUTER-READABLE MEDIA FOR USING IMMUTABLE AND COPY-ON-WRITE DATA SEMANTICS TO OPTIMIZE RECORD AND REPLAY FRAMEWORKS

(71) Applicant: Microsoft Technology Licensing, LLC, Redmond, WA (US)

(72) Inventor: Mark Marron, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 204 days.

(21) Appl. No.: 15/485,458

(22) Filed: Apr. 12, 2017

(65) Prior Publication Data

US 2018/0300197 A1    Oct. 18, 2018

(51) Int. Cl.
*G06F 11/36* (2006.01)
*G06F 11/07* (2006.01)
*G06F 11/34* (2006.01)

(52) U.S. Cl.
CPC ........ *G06F 11/3628* (2013.01); *G06F 11/079* (2013.01); *G06F 11/3414* (2013.01)

(58) Field of Classification Search
CPC ............... G06F 11/079; G06F 11/3414; G06F 11/3476; G06F 11/3628; G06F 11/366
See application file for complete search history.

(56) References Cited

U.S. PATENT DOCUMENTS 8,281,293 B2 * 10/2012 Fulton ................... G06F 9/4493
717/151
8,402,318 B2 * 3/2013 Nieh ................... G06F 11/3419
714/15

(Continued)

OTHER PUBLICATIONS

Wang YM, Damani OP, Garg VK; "Distributed Recovery with K-Optimistic Logging;" In Distributed Computing Systems; 1997; Proceedings of the 17th International Conference on May 27, 1997 (pp. 60-67). IEEE.*

(Continued)

*Primary Examiner* — Joseph R Kudirka
(74) *Attorney, Agent, or Firm* — Drinker Biddle & Reath LLP

(57) ABSTRACT

Systems, methods, and computer-readable media are disclosed for using managed runtime environment semantics to optimize record and replay frameworks. One method includes: executing, by the computing system, a managed runtime component; interacting, by the computing system, with another system during the execution of the managed runtime component; determining, by the computing system, whether a non-deterministic event is to be logged in event logs during the execution of the managed runtime component; determining, by the computing system when the non-deterministic event is to be logged, whether semantics of the non-deterministic event to be logged includes a predetermined semantic, wherein the predetermined semantic includes one or more of optimistic zero copy actions; and logging, by the computing system when the semantics of the non-deterministic event includes the predetermined semantic, a copy of contents of the non-deterministic event in event logs during the execution of the managed runtime component.

20 Claims, 9 Drawing Sheets

(56) References Cited

U.S. PATENT DOCUMENTS

| | | | | |
|---|---|---|---|---|
| 8,473,946 | B2* | 6/2013 | Malyugin | G06F 11/3414 |
| | | | | 718/1 |
| 8,499,297 | B2* | 7/2013 | Chen | G06F 11/1438 |
| | | | | 718/1 |
| 8,499,299 | B1* | 7/2013 | Jakab | G06F 9/45504 |
| | | | | 710/200 |
| 9,189,446 | B2* | 11/2015 | Hunter | G06F 9/544 |
| 2010/0211933 | A1 | 8/2010 | Kiel et al. | |
| 2015/0378870 | A1 | 12/2015 | Marron et al. | |
| 2016/0292061 | A1* | 10/2016 | Marron | G06F 11/362 |

OTHER PUBLICATIONS

Steidl, Niklas, "A Time Travelling Debugger for Python", http://www.imperial.ac.uk/media/imperial-college/faculty-of-engineering/computing/public/NiklasSteidl.pdf, Published on: Jun. 2016, 87 pages.

Miraglia, et al., "Peeking into the Past: Efficient Checkpoint-Assisted Time-Traveling Debugging", In Proceedings of IEEE 27th International Symposium on Software Reliability Engineering, Oct. 23, 2016, pp. 455-466.

Phang, et al., "Expositor: Scriptable time-travel debugging with first-class traces", In Proceedings of 35th International Conference on Software Engineering, May 18, 2013, pp. 352-361.

"Elm's Time Traveling Debugger", http://debug.elm-lang.org/, Published on: 2014, 4 pages.

Subhraveti, et al., "Record and Transplay: Partial Checkpointing for Replay Debugging Across Heterogeneous Systems", In Proceedings of the ACM SIGMETRICS joint international conference on Measurement and modeling of computer systems, Jun. 7, 2011, pp. 109-120.

"Google Cloud Platform : Stackdriver Logging", http://web.archive.org/web/20160331002341/https:/cloud.google.com/logging/, Published on: Mar. 31, 2016, 7 pages.

Huang, et al., "LEAP: Lightweight Deterministic Multi-processor Replay of Concurrent Java Programs", In Proceedings of the eighteenth ACM SIGSOFT international symposium on Foundations of software engineering, Nov. 7, 2010, pp. 207-216.

Geels, et al., "Replay Debugging for Distributed Applications", In Proceedings of the Annual Technical Conference on USENIX, May 30, 2006, pp. 289-300.

Barr, et al., "Tardis: Affordable time-travel debugging in managed runtimes", In Proceedings of the ACM International Conference on Object Oriented Programming Systems Languages & Applications, Oct. 20, 2014, pp. 67-82.

Barr, et al., "Time-travel debugging for JavaScript/Node.js", In Proceedings of the 24th ACM SIGSOFT International Symposium on Foundations of Software Engineering, Nov. 13, 2016 , pp. 1003-1007.

Burg, et al., "Interactive record/replay for web application debugging", In Proceedings of the 26th annual ACM symposium on User interface software and technology, Oct. 8, 2013 , pp. 473-484.

Burtsev, et al., "Abstractions for practical virtual machine replay", In Proceedings of the 12th ACM SIGPLAN/SIGOPS International Conference on Virtual Execution Environments, Apr. 2, 2016, pp. 93-106.

Holman, Michael, "Microsoft/ChakraCore", https://github.com/Microsoft/ChakraCore, Retrieved on: Mar. 2, 2017, 3 pages.

Jiang, et al., "Context-aware statistical debugging: From bug predictors to faulty control flow paths", In Proceedings of the twenty-second IEEE/ACM international conference on automated software engineering, Nov. 5, 2007, pp. 184-193.

"JavaScript Runtime Hosting", https://msdn.microsoft.com/en-us/library/dn249673(v=vs.94).aspx, Retrieved on: Mar. 2, 2017, 1 pages.

Phang, et al., "Expositor: Scriptable time-travel debugging with first-class traces", In Proceedings of the International Conference on Software Engineering, May 18, 2013, pp. 352-361.

King, et al., "Debugging operating systems with time-traveling virtual machines", In Proceedings of USENIX Annual Technical Conference, Apr. 10, 2005, pp. 1-15.

Ko, et al., "Debugging reinvented: Asking and answering why and why not questions about program behavior", In Proceedings of the 30th international conference on Software engineering, May 10, 2008, pp. 301-310.

Gimeno, Santiago, "libuv/libuv", https://github.com/libuv/libuv, Retrieved on: Mar. 2, 2017, 5 pages.

Pathak, Kunal, "Nodejs/Node-Chakracore", https://github.com/nodejs/node-chakracore, Retrieved on: Mar. 2, 2017, 4 pages.

O'Callahan, et al., "Lightweight user-space record and replay", In Journal of Computing Research Repository, Oct. 2016, pp. 1-14.

"Undo", http://undo.io/, Retrieved on: Mar. 2, 2017, 5 pages.

Vilk, et al., "A gray box approach for high-fidelity, high-speed time-travel debugging", In Technical Report of MSR-TR-2016-7, Jun. 19, 2016, 14 pages.

* cited by examiner

SYSTEMS, METHODS, AND COMPUTER-READABLE MEDIA FOR USING IMMUTABLE AND COPY-ON-WRITE DATA SEMANTICS TO OPTIMIZE RECORD AND REPLAY FRAMEWORKS

TECHNICAL FIELD

Embodiments of the present disclosure relate generally to storing, accessing, and editing data. More specifically, embodiments of the present disclosure relate to recording and replaying application data.

INTRODUCTION

Program execution record and replay frameworks operate by logging the interactions of an application with an external environment. Then, at a point in time later, replaying these interactions to recreate the original execution of the program. By using this core technology, tools, such as time-traveling debuggers, automated failure root-cause analyzers, memory use analyzers, etc. may be built.

A major challenge in the implementation of a record and replay system is that time and memory overheads are imposed on the execution of the application being recorded. Research and industrial communities have made substantial progress in reducing these overheads for programs, which are computation bound or where the amount of data received from the external environment is limited. However, in cases where an application has extensive interactions with high-volume external data sources, such as file input/output ("I/O") and/or network I/O, the cost of recording these interactions may rise rapidly. Previous work has proposed leveraging copy-on-write ("COW") file system features in an operating system ("OS") to reduce costs of file I/O. However, such solutions depend on the underlying OS and runtime support, and the solutions do not help with I/O due to network or other sources.

As a record and replay framework must have access to data received from external sources in order to recreate the original execution of an application, costs of these copy operations are fundamentally unavoidable in the most general case. However, many scenarios that use record and replay frameworks may be primarily interested in a short time slice that lead up to an event of interest, such as a program crash. In such scenarios, a full history of an application program execution is not required. As a consequence, most practical systems default to a ring buffer mode, which only keeps a fixed number of events or a length of time of execution and discards events as the events roll past this point.

In record and replay systems for managed runtimes and languages, such as Java, C#, JavaScript, etc., two observations may be made: (1) In scenarios using ring buffer mode, a vast majority of the data that is written into an event log and/or a snapshot log may be discarded without being used. Thus, when possible, any data copying work based on the expectation that the actual copied data will not be needed should be deferred. (2) For managed runtime environments and languages, a deep understanding of immutable values in the language, such as strings, and control of which buffers are passed to OS level operations to be filled with I/O data, is available. Thus, in many cases, any data in these structures may be passed to the userland application without preemptively preserving any data that came from the outside environment.

As discussed in more detail below, using these two observations, naive preemptive copying based logging of any application program interface ("API") that returns a string or typed buffer to userland code may be converted into an optimized deferred copying based logging API. Based on the foregoing, it is desirable to provide optimized APIs that may be a 0-copy if the event rolls off the ring buffer while ensuring that, if the event needs to be saved, the original data can be copied into the record and replay log.

SUMMARY OF THE DISCLOSURE

According to certain embodiments, systems, methods, and computer-readable media are disclosed for using managed runtime environment semantics to optimize record and replay frameworks.

According to certain embodiments, computer-implemented methods for using managed runtime environment semantics to optimize record and replay frameworks are disclosed. One method includes: executing, by a computing system, a managed runtime component; interacting, by the computing system, with another system during the execution of the managed runtime component; determining, by the computing system, whether a non-deterministic event is to be logged in event logs during the execution of the managed runtime component; determining, by the computing system when the non-deterministic event is to be logged, whether semantics of the non-deterministic event to be logged includes a predetermined semantic, wherein the predetermined semantic includes one or more of optimistic zero copy actions; and logging, by the computing system when the semantics of the non-deterministic event includes the predetermined semantic, a copy of contents of the non-deterministic event in event logs during the execution of the managed runtime component.

According to certain embodiments, systems using managed runtime environment semantics to optimize record and replay frameworks are disclosed. One system including: at least one processor; and memory comprising a managed runtime environment executable by the at least one processor, wherein the managed runtime environment, when executed by the at least one processor: executes a managed runtime component; interacts with another system during the execution of the managed runtime component; determines whether a non-deterministic event is to be logged in event logs during the execution of the managed runtime component; determines, when the non-deterministic event is to be logged, whether semantics of the non-deterministic event to be logged includes a predetermined semantic, wherein the predetermined semantic includes one or more of optimistic zero copy actions; and logs, when the semantics of the non-deterministic event includes the predetermined semantic, a copy of contents of the non-deterministic event in event logs during the execution of the managed runtime component.

According to certain embodiments, non-transitory computer-readable media are disclosed that store instructions that, when executed by a computer, cause the computer to perform a method for using managed runtime environment semantics to optimize record and replay frameworks. One method of the computer-readable media including: executing, by the computing system, a managed runtime component; interacting, by the computing system, with another system during the execution of the managed runtime component; determining, by the computing system, whether a non-deterministic event is to be logged in event logs during the execution of the managed runtime component; determining, by the computing system when the non-deterministic event is to be logged, whether semantics of the non-deterministic event to be logged includes a predetermined semantic, wherein the predetermined semantic includes one or more of optimistic zero copy actions; and logging, by the computing system when the semantics of the non-deterministic event includes the predetermined semantic, a copy of contents of the non-deterministic event in event logs during the execution of the managed runtime component.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

In the course of the detailed description to follow, reference will be made to the attached drawings. The drawings show different aspects of the present disclosure and, where appropriate, reference numerals illustrating like structures, components, materials and/or elements in different figures are labeled similarly. It is understood that various combinations of the structures, components, and/or elements, other than those specifically shown, are contemplated and are within the scope of the present disclosure.

Moreover, there are many embodiments of the present disclosure described and illustrated herein. The present disclosure is neither limited to any single aspect nor embodiment thereof, nor to any combinations and/or permutations of such aspects and/or embodiments. Moreover, each of the aspects of the present disclosure, and/or embodiments thereof, may be employed alone or in combination with one or more of the other aspects of the present disclosure and/or embodiments thereof. For the sake of brevity, certain permutations and combinations are not discussed and/or illustrated separately herein.

Figure 1:
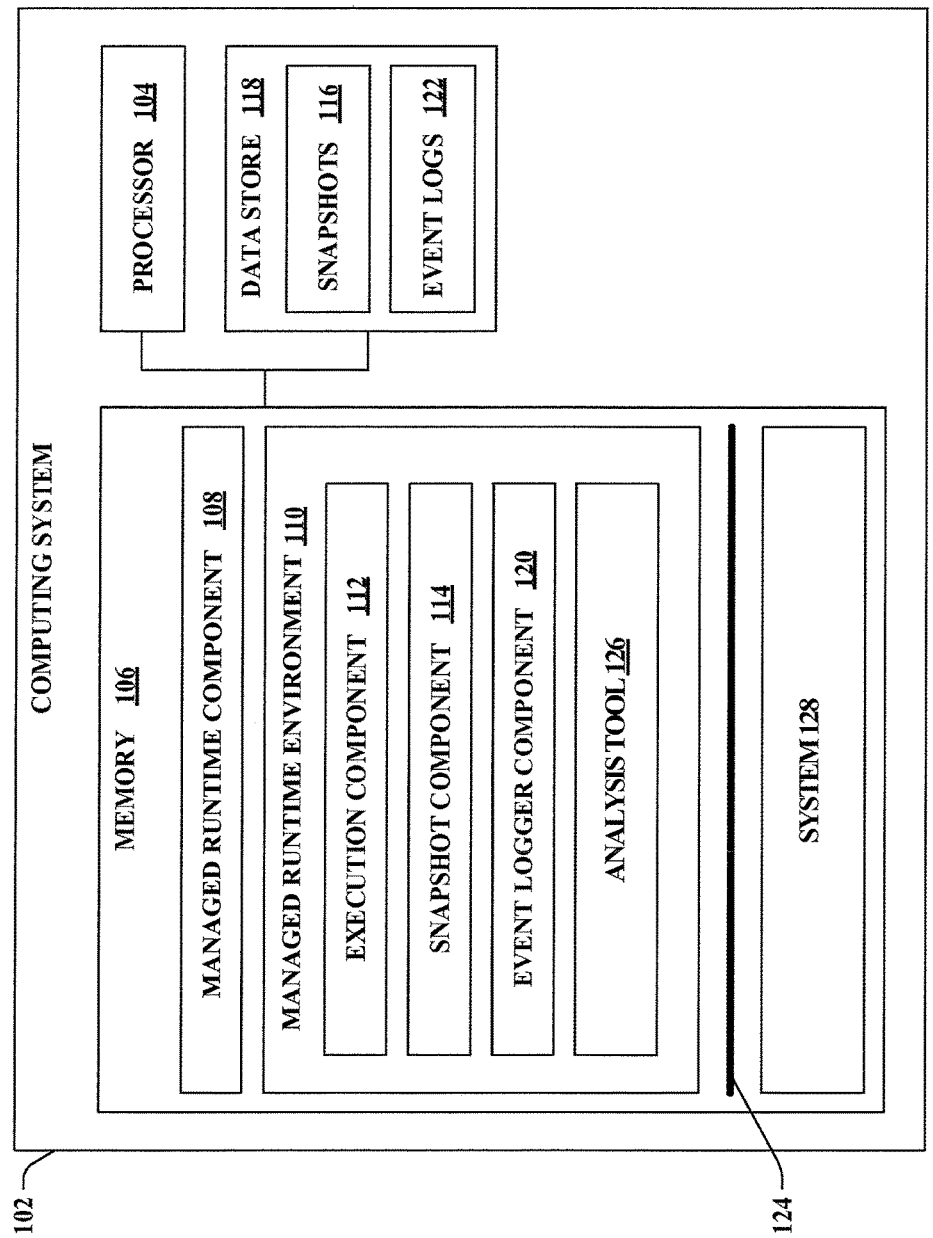
FIG. 1 depicts a computing system that performs application record and replay, according to embodiments of the present disclosure.

Again, there are many embodiments described and illustrated herein. The present disclosure is neither limited to any single aspect nor embodiment thereof, nor to any combinations and/or permutations of such aspects and/or embodiments. Each of the aspects of the present disclosure, and/or embodiments thereof, may be employed alone or in combination with one or more of the other aspects of the present disclosure and/or embodiments thereof. For the sake of brevity, many of those combinations and permutations are not discussed separately herein.

DETAILED DESCRIPTION OF THE EMBODIMENTS

One skilled in the art will recognize that various implementations and embodiments of the present disclosure may be practiced in accordance with the specification. All of these implementations and embodiments are intended to be included within the scope of the present disclosure.

As used herein, the terms "comprises," "comprising," "have," "having," "include," "including," or any other variation thereof, are intended to cover a non-exclusive inclusion, such that a process, method, article, or apparatus that comprises a list of elements does not include only those elements, but may include other elements not expressly listed or inherent to such process, method, article, or apparatus. The term "exemplary" is used in the sense of "example," rather than "ideal." Additionally, the term "or" is intended to mean an inclusive "or" rather than an exclusive "or." That is, unless specified otherwise, or clear from the context, the phrase "X employs A or B" is intended to mean any of the natural inclusive permutations. For example, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

For the sake of brevity, conventional techniques related to systems and servers used to conduct methods and other functional aspects of the systems and servers (and the individual operating components of the systems) may not be described in detail herein. Furthermore, the connecting lines shown in the various figures contained herein are intended to represent exemplary functional relationships and/or physical couplings between the various elements. It should be noted that many alternative and/or additional functional relationships or physical connections may be present in an embodiment of the subject matter.

Reference will now be made in detail to the exemplary embodiments of the disclosure, examples of which are illustrated in the accompanying drawings. Wherever possible, the same reference numbers will be used throughout the drawings to refer to the same or like parts.

The present disclosure generally relates to, among other things, creating, generating, retrieving, deleting, reviewing, playing back, and/or rolling back of logged event data in storage. More particularly, the present disclosure discloses a set of techniques and protocols that may use immutable and copy-on-write data semantics to optimize record and replay frameworks. While the present disclosure describes techniques in the context of a managed runtime environment of a JavaScript engine, a person of ordinary skill in the art may apply the techniques described herein to other environments and engines.

Referring now to the drawings, FIG. 1 depicts a computing system 102 that performs application record and replay, according to embodiments of the present disclosure. The computing system 102 may include at least one processor 104 and memory 106. The at least one processor 104 may be configured to execute instructions loaded into the memory 106 (e.g., system(s) and/or component(s) loaded into the memory 106 are executable by the processor 104). As described in greater detail herein, the memory 106 may include instructions configured to perform time travel debugging, automated failure root-cause analysis, and/or memory use analysis for a system 128, such as a cloud-based system, server system, client system, and/or a browser system.

According to various examples, the computing system 102 may be or may include a computing device. Pursuant to various illustrations, the computing device may be a desktop computing device, a mobile computing device (e.g., a laptop computing device, a mobile telephone, a tablet computing device, a wearable computing device, a handheld computing device, a portable gaming device, a personal digital assistant ("PDA"), etc.), a gaming console, a set-top box, an in-vehicle communications and infotainment system, or the like. In accordance with other examples, the computing system 102 may be or may include one or more server computing devices. For instance, the computing system 102 may be or may include one or more data centers, where a data center includes a plurality of server computing devices. Additionally or alternatively, the computing system 102 may be a distributed computing system.

The memory 106 of the computing system 102 may include a managed runtime component 108 and a managed runtime environment. The computer-executable program 108 may include a sequence of instructions that are executable under control of the managed runtime environment 110. The managed runtime environment 110 may compile and/or interpret the computer-executable program 108 for the processor 104 and may perform the instructions included in the computer-executable program 108.

The memory 106 may further include a browser system 128 (e.g., a web browser). The system 128, such as a cloud-based system, server system, client system, and/or a browser system, may be configured to retrieve, present, and traverse information available on a network, in a file system (e.g., of the computing system 102 or a disparate computing system), or the like.

Moreover, an optional interrogative managed runtime environment interface 124 may be an optional interface between the managed runtime environment 110 and the system 128. The optional interrogative managed runtime environment interface 124 may be used to enable nondeterministic events to be exposed to the managed runtime environment 110. The optional interrogative managed runtime environment interface 124 may expose minimal amounts of state belonging to otherwise opaque black box components. A minimal amount of state from a particular black box component may be a least amount of state for accurately snapshotting and logging events for such a black box component.

The managed runtime environment 110 may be a process virtual machine and/or a virtual environment that runs as an application inside a host operating system and supports a process. The managed runtime environment 110 may provide a platform-independent programming environment that abstracts details of the underlying hardware or operating system, and may enable the computer-executable program 108 to be executed on differing platforms.

According to exemplary embodiments, the managed runtime component 108 may be or may include a script written component in a scripting language (e.g., JavaScript, etc.). Then, the script written component in the scripting language may be interpreted and executed by the managed runtime environment 110. While the present disclosure describes techniques in the context of a managed runtime environment of a JavaScript engine, it is contemplated that other types of managed runtime component, computer-executable programs, and/or other types of virtual machines and/or environments (other types of managed runtimes) are intended to fall within the scope of the hereto appended claims (e.g., a managed runtime component written in the Java programming language and Java web toolkit ("JWt"), a managed runtime component written in the C# programming language, and Windows Presentation Foundation ("WPF"), etc.). For example, embodiments of the present disclosure are also applicable to managed runtimes in cloud-based and/or server applications (such as, Node.js, ASP.NET, various Java frameworks, etc.) and client-side applications (such as, ReactNative, C#/WPF, Java/Swing, etc.) as well as browser-based applications.

The managed runtime environment 110 may include an execution component 112 that may be configured to receive the managed runtime component 108. Moreover, the execution component 112 may be configured to execute the managed runtime component 108.

According to exemplary embodiments, the execution component 112 may be or may include an interpreter. According to an exemplary scenario, the interpreter may directly perform the instructions of the managed runtime component 108. In accordance with another exemplary scenario, the interpreter may translate the instructions of the managed runtime component 108 to an intermediate representation and may execute the intermediate representation. According to yet another exemplary scenario, the instructions of the managed runtime component 108 may include precompiled code, and the interpreter may execute such precompiled code (e.g., the precompiled code may be machine independent code). Moreover, it is contemplated that a combination of the foregoing exemplary scenarios may be implemented by the interpreter. Further, pursuant to an illustration, it is contemplated that the interpreter may be a bytecode interpreter. Additionally and/or alternatively, other types of interpreters are intended to fall within the scope of the hereto appended claims.

By way of another exemplary embodiment, the execution component 112 may additionally and/or alternatively be or may include a just-in-time ("JIT") compiler. The JIT compiler may convert intermediate language instructions of the managed runtime component 108 to machine instructions for execution by the processor 104. Further, the JIT compiler may execute the machine instructions.

The managed runtime environment 110 may further include a snapshot component 114 configured to record a sequence of snapshots 116 of the managed runtime environment 110 (e.g., runtime snapshots) during execution of the managed runtime component 108 at various times. The snapshot component 114 may be configured to record the snapshots 116 via the optional interrogative managed runtime environment interface 124. Moreover, the snapshots 116 recorded by the snapshot component 114 may be stored in a data store 118 of the computing system 102. The managed runtime component 108, during execution by the execution component 112, may store data in variables, which represent storage locations in the memory 106 (e.g., call stack, heap, etc.). At a given point during the execution of the managed runtime component 108, content of the storage locations in the memory 106 may be recorded as a snapshot of the managed runtime environment 110.

According to exemplary embodiments, the snapshots 116 in the sequence may be periodically recorded by the snapshot component 114 at a predefined time interval. Pursuant to other exemplary embodiments, a time interval at which the snapshots 116 are sequentially recorded by the snapshot component 114 may be dynamically adjusted. Thus, the time interval may be dynamically adjusted during the execution of the managed runtime component 108.

Moreover, the managed runtime environment 110 may include an event logger component 120 configured to log non-deterministic events during execution of the managed runtime component 108 as part of event logs 122. The event logs 122, for example, may be stored in the data store 118. The event logger component 120 may log the non-deterministic events that affect execution of the managed runtime component 108, and/or optionally via the optional interrogative managed runtime environment interface 124. For instance, the managed runtime environment 110 may be extended to define the optional interrogative managed runtime environment interface 124, which may enable the event logger component 120 to capture various non-traditional events. Moreover, the event logs 122 may enable a variety of debugging analyses, such as, for example, time travel debugging, automated failure root-cause analysis, memory use analysis, etc.

The snapshot component 114 and the event logger component 120 may efficiently capture application-level semantics of the snapshots 116 and the event logs 122. Further, due to the optional interrogative managed runtime environment interface 124, the snapshot component 114 and the event logger component 120 may capture application-level semantics in order to reduce the size of the snapshots 116 and the event logs 122. Further, by raising an abstraction level of the optional interrogative managed runtime environment interface 124 to that of the application of interest, the snapshot component 114 and/or the event logger component 120 may ignore portions of architectural state in an operating system ("OS") and the hardware when capturing the snapshots 116 and/or the event logs 122.

According to exemplary embodiments, the managed runtime environment 110 may be a runtime environment layered atop a lower-level runtime environment. Such virtualized interfaces may enable various useful services. For example, the managed runtime environment 110 may hide sensitive low-level resources from untrusted applications (e.g., such resources may be hidden from the managed runtime component 108), and may cause potentially dangerous operations to pass dynamic security checks. Moreover, if the event logger component 120 of the managed runtime environment 110 logs the non-deterministic data that the managed runtime environment 110 exchanges with the managed runtime component 108, then the event logs 122 may later be used by a analysis tool 126, such as a time travel debugger, automated failure root-cause analyzer, and/or memory use analyzer, to replay the execution of the managed runtime component 108. The replayed executions, for instance, may be useful for security forensics and debugging of the managed runtime component 108. The managed runtime environment 110 may also define an encapsulation boundary for a state of the managed runtime component 108 (e.g., the snapshots 116 may be useful for suspend/resume services, and for migrating applications across different machines).

Various properties of the optional interrogative managed runtime environment interface 124 are now described. The optional interrogative managed runtime environment interface 124 may reduce a size of a managed runtime environment state (in comparison to conventional low-level machines). Smaller managed runtime environments may be faster to snapshot, faster to load, and faster to transfer across a network as compared to larger managed runtime environments. Thus, reducing the size of a managed runtime environment may make it cheaper to perform suspension, resumption, and migration of a managed runtime environment. Smaller managed runtime environments may also allow data center operators to place more managed runtime environments on a single physical server, which allows for enhanced server utilization.

Moreover, the optional interrogative managed runtime environment interface 124 may cause a size of the non-deterministic event logs 122 to be reduced (relative to conventional low-level managed runtime environments). For many debugging and forensics scenarios, static snapshots 116 of the managed runtime environment 110 may provide insufficient context. Thus, the snapshots 116 may be supplemented with the event logs 122 that describe how the managed runtime environment 110 evolves between the snapshots 116. Small event logs 122, combined with small snapshots 116, make it feasible to store long-term execution traces for complex applications (e.g., the managed runtime component 108).

Further, the optional interrogative managed runtime environment interface 124 may enable the snapshots 116 and the event logs 122 to be semantically complete. The snapshots 116 and the event logs 122 may include information for understanding an execution history of the managed runtime component 108 by the managed runtime environment 110. Thus, execution analyses may be performed without using heuristics for inferring application state (e.g., such heuristics may be fallible).

Moreover, the optional interrogative managed runtime environment interface 124 may enable efficient generation of the snapshots 116 by the snapshot component 114 and the event logs 122 by the event logger component 120. Accordingly, snapshotting and event logging may be fast and may have low computational overheads due to the interrogative managed runtime environment interface 124 (e.g., as compared to snapshotting and event logging for conventional low-level managed runtime environments.).

Interrogative virtualization may supported by the optional interrogative managed runtime environment interface 124. A level of abstraction of the optional interrogative managed runtime environment interface 124 for the managed runtime environment 110 may be raised as compared to some conventional managed runtime environment interfaces for some traditional managed runtime environments. More particularly, the optional interrogative managed runtime environment interface 124 may be moved away from interfaces presented by the hardware and/or the operating system, and towards an application-level semantic interface. For example, managed language runtimes and application frameworks may mediate interactions of a program with the local machine and the outside world. Virtualizing at the application-visible level of abstraction allows large amounts of architectural state that may be captured by low-level approaches to be ignored. However, not all of the low-level state may be ignored as is common with conventional managed language runtimes and application frameworks. For example, a raw bitmap for a display may be hidden by the application-visible graphics interface, but this state may be needed for understanding the execution history of the managed runtime component 108. Thus, interrogative virtualization may make modifications to the high-level application interface, instead of providing the optional interrogative managed runtime environment interface 124 that exposes events to the managed runtime environment 110, which may be hidden from the managed runtime component 108. The managed runtime environment 110 may interrogate nominally black box components via the optional interrogative managed runtime environment interface 124 to enable the snapshot component 114 and the event logger component 120 to capture the application-level semantics while safely ignoring many details at the hardware or operating system level.

Traditional managed runtime environments may tend to be designed to provide efficient and strong isolation between different managed runtime environments. As a result, these traditional managed runtime environments may provide narrow, low-level interfaces to minimize the trusted computing base and leverage hardware support for virtualization. However, virtualizing at a low-level may involve a trade-off, i.e., isolation may become cheap, but other virtual machine operations may become expensive. For instance, conventional managed runtime environment snapshots may be large because they include substantial amounts of architectural state. Further, execution traces may grow quickly due to the vast number of low-level non-deterministic events. Moreover, application-level program analysis may overdetermined, since a conventional managed runtime environment may include data from multiple layers in the software and hardware stack, when often the top layers (without the lower layers) may enable understanding execution of a managed runtime component.

In contrast to traditional managed runtime environments, the optional interrogative managed runtime environment interface 124 for the managed runtime environment 110 may be high-level and wide enough to capture application semantics. Compared to low-level, narrow virtualization interfaces, the optional interrogative managed runtime environment interface 124 may enable implementing various managed runtime environment operations using an order of magnitude less time and space. To provide strong, efficient isolation, the optional interrogative managed runtime environment interface 124 may be nested within a low-level virtualization framework, which can provide security. Thus, security may not be sacrificed for performance.

The managed runtime environment 110 may also include the analysis tool 126. In the embodiments described below the analysis tool 126 may be a time travel debugger, which may be referred to as time travel debugger 126 and time travel debugger component 126. However, other analysis tools, such as an automated failure root-cause analyzer and/or memory use analyzer, may be used in place of the time travel debugger, as discussed below with a particular embodiment.

The time travel debugger 126 may be configured to test and debug the managed runtime component 108. The time travel debugger 126 may be a debugger that steps forwards and backwards through execution of a managed runtime component (e.g., the managed runtime component 108) during a debugging session. In contrast, conventional debuggers oftentimes tend to step forwards through execution of a managed runtime component during a debugging session, without being able to step backwards through such execution. For instance, the time travel debugger 126 may allow execution to be reversed during a debugging session (e.g., if a breakpoint is set too late so as to not require re-execution of a managed runtime component with the breakpoint moved to be earlier in time). The time travel debugger 126 may support forward and reverse debugging of the managed runtime component 108.

As discussed above, when the managed runtime component 108 is executed by the execution component 112, the snapshot component 114 may record the snapshots 116 and the event logger component 120 may record non-deterministic events in the event logs 122 to capture the execution of the managed runtime component 108. The time travel debugger 126 may be configured to replay the execution of the managed runtime component 108 by stepping the execution of the managed runtime component 108 both forwards and backwards in time.

The time travel debugger 126 may be configured to replay at least a portion of the execution of the managed runtime component 108 based at least in part on a snapshot (from the snapshots 116) and at least a portion of the event logs 122. Additionally, and/or alternatively, using the optional interrogative managed runtime environment interface 124, the time travel debugger 126 may enable time travel debugging for the system 128. Conventionally, time travel debugging may be too expensive to run on production servers or on resource-limited end-user machines with poor network connections.

The time travel debugger 126 may be configured to perform backwards-facing variants for traditional forward-facing operations like step-forward and step-out. By instrumenting the optional interrogative managed runtime environment interface 124, the event logger component 120 may log non-deterministic events (e.g., the event logs 122) and the snapshot component 114 may capture the snapshots 116 of the managed runtime environment 110. Later, during a debugging session, the time travel debugger 126 may be configured to travel to a time t by identifying a snapshot from the snapshots 116 that temporally precedes time t, loading the snapshot that temporally preceded time t, and then replaying the event logs 122 from the snapshot to the time t. For example, a most recent snapshot from the snapshots 116 that occurred before t may be loaded by the time travel debugger 126. Additionally and/or alternatively, a different snapshot from the snapshots 116 that occurred before the time t may be loaded by the time travel debugger 126.

By logging events and tracking state at the level of the optional interrogative managed runtime environment interface 124, storage overheads can be reduced in comparison to systems that introspect at a lower level (e.g., x86 instructions, or systems calls and UNIX signals). With the optional interrogative managed runtime environment interface 124, sizes of the snapshots 116 of the state of the managed runtime environment 110 and the non-deterministic event logs 122 may be decreased as compared to lower level approaches. For instance, heap-intensive applications may have compressed snapshots that are less than 500 KB in size. Additionally, for example, interactive games and applications may have event logs that grow at about 1 KB per second. The time travel debugger 126 may also provide more robust, higher-fidelity replay than conventional systems that lack the vantage point of the optional interrogative managed runtime environment interface 124, and which consequently may rely on inference methods to reconstruct state that is readily available in the interrogative system as described herein.

The managed runtime environment 110, with and/or without the optional interrogative managed runtime environment interface 124, may enable non-determinism logging of event logs 122 and capturing of snapshots 116. Further, the snapshots 116 and the event logs 122 may be device and address independent. According to exemplary embodiments, the time travel debugger 126, on a program bug, may report an error state as well as last k-seconds of events before a bug. Pursuant to an illustration, the snapshots 116 and the event logs 122 may be at the JavaScript/HTML level, which may be saved for later debugging or transmitted to another computing system. Moreover, the other computing system may not have the same version of JavaScript/HTML engines or operating system. However, the claimed subject matter is not limited to the foregoing illustration.

Other analysis tools 126, such as an automated failure root-cause analyzer and/or memory use analyzer, may be used in place of the time travel debugger, as discussed above.

According to an embodiment of the present disclosure, an automated failure root-cause analyzer may automatically determine a root cause of a system failure, and may automatically transfer that information for further analysis. The automated failure root-cause analyzer may use the record and replay framework to observe a buggy application's behavior on different inputs, to reproduce the bug, and then to localize the bug in the application's source. Reproducing, localizing, and then fixing a bug may involve forming and validating hypotheses about the bug's root cause, the first point at which the application's state diverges from an intended state. To validate a hypothesis, a developer may use the automated failure root-cause analyzer to halt an application's execution and examine its state.

An automated failure root-cause analyzer may provide a low cost method for obtaining the execution history for an application. The automated failure root-cause analyzer may utilize the execution history to construct an application slice of statements that explain why and how a particular value was computed. Further, the automated failure root-cause analyzer may provide automated error detection and root cause analysis that uses execution history information to automatically identify and localize a variety of software defects. Accordingly, automated failure root-cause analyzers may use the record and replay framework discussed herein to efficiently replay snippets of an application's execution and track exactly the required information.

According to an embodiment of the present disclosure, a memory use analyzer may provide the ability to acquire and analyze information about an operating system, running processes, and applications. This capability may involve acquiring memory data for analysis by a memory use analysis tool. Examples of acquiring and analyzing memory artifacts may include: acquisition of process information and identification of suspicious processes, acquisition and analysis of dynamic link library ("DLL") processes and handling, acquisition and analysis of code injection behavior, acquisition and analysis of kernel hooking (e.g., rootkit behavior), and/or acquisition and analysis of process memory dumping and mapping. Event logs are a key tool for memory use analysis to determine various activities on a computing system. For a memory use analyzer, event logs may be acquired and analyzed from a computing system. Accordingly, memory use analyzers may use the record and replay framework discussed herein to efficiently replay snippets of an application's execution and may track exactly the required information.

Figure 2:
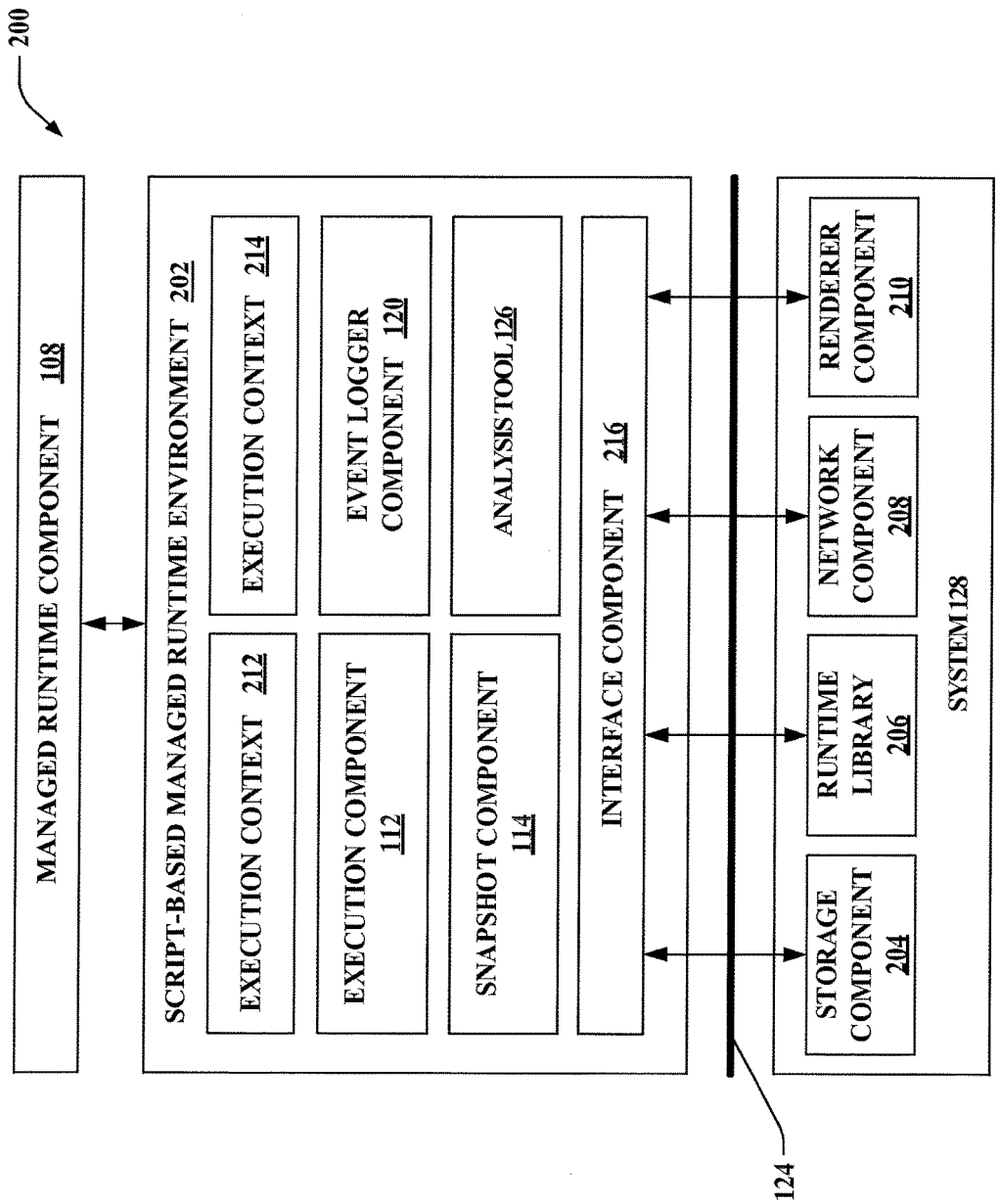
FIG. 2 depicts a system that enables application record and replay, according to embodiments of the present disclosure.

FIG. 2 depicts a system 200 that enables application record and replay, according to embodiments of the present disclosure. The system 200 may include a script-based managed runtime environment 202. Accordingly, as set forth in the example of FIG. 2, the managed runtime environment 110 can be the script-based managed runtime environment 202. The script-based managed runtime environment 202 may interpret and execute the managed runtime component 108. More particularly, the managed runtime component 108 may be a script written component in a scripting language (e.g., JavaScript, etc.). Thus, the script-based runtime environment 202 may interpret and execute such script. Moreover, the script-based managed runtime environment 202 may include the execution component 112, the snapshot component 114, the event logger component 120, and the analysis tool 126, such as a time travel debugger, automated failure root-cause analyzer, and/or memory use analyzer.

The system 200 may further include the system 128, such as a cloud-based system, server system, client system, and/or a browser system. The system 128 may also include various components. As depicted, the system 128 may include a storage component 204, a runtime library 206, a network component 208, and a renderer component 210. However, it is contemplated that the system 128 may lack one or more of the foregoing components and/or may include different components. Moreover, the optional interrogative managed runtime environment interface 124 may be an interface between the script-based managed runtime environment 202 and the system 128.

The script-based managed runtime environment 202 may include one or more execution contexts. As depicted in FIG. 2, the script-based managed runtime environment 202 may include an execution context 212 and an execution context 214. However, it is contemplated that the script-based managed runtime environment 202 may include more or less than two execution contexts. The execution contexts of the script-based virtual machine 202 may be collectively referred to herein as execution contexts 212-214. Each of the execution contexts 212-214 may be single-threaded and event-driven.

According to an exemplary embodiment, as the execution context 212 (or any of the other execution contexts 212-214) runs its initialization code, callback functions that respond to events may be defined. After the initialization code terminates, subsequent code execution may be driven by reception of events and firing of associated handlers. Since the execution context 212 is single-threaded, a call chain that is initiated by an event handler may be atomic, and, once started, the call chain may run to completion. Accordingly, at any given time, the execution context 212 may have at most one active call chain. Moreover, different execution contexts 212-214 may exchange data using an asynchronous, pass-by-value communication channel (e.g., postMessage( )).

The components of the system 128 (e.g., the storage component 204, the runtime library 206, the network component 208, the renderer component 210, etc.) may be event-driven black box components. The components of the system 128 may be black boxes because, from the perspective of the managed runtime component 108, such components hide their implementations behind opaque interfaces. However, the execution contexts 212-214 are event-driven, and thus, the black box components may export event-driven interface(s) to intemperate with the managed runtime component 108.

The script-based managed runtime environment 202 may include an interface component 216 configured to interact with the black box components of the system 128 via exposed interfaces (e.g., application programming interfaces ("APIs")) of the black box components. Accordingly, the black box components of the system 128 may be interrogated by the interface component 216 of the script-based managed runtime environment 202 optionally via the optional interrogative managed runtime environment interface 124.

In an exemplary embodiment, the renderer component 210 may be a black box component of the system 128. Internally, the renderer component 210 may be written in a computer language, such as C++, and it may use multiple threads or processes to calculate visual layouts and update a bitmap. However, from the perspective of an execution context (e.g., one of the execution contexts 212-214, a frame in a web page), the renderer component 210 may expose a single-threaded, event-driven API through a Document Object Model (DOM). To receive notifications about changes to DOM state by the renderer component 210, the managed runtime component 108 may register callbacks which the renderer component 210 triggers when the relevant state changes. The managed runtime component 108 may modify DOM state through a variety of synchronous and asynchronous APIs. However, even the synchronous APIs may be implemented as remote procedure call ("RPC") messages that trigger event handlers in the renderer component 210, and to provide synchronous semantics, the system 128 may pause the caller until the renderer component 210 has responded to the RPC request.

The script-based managed runtime environment 202 may include one or more message-driven execution contexts 212-214, some of which may be black boxes with respect to the managed runtime component 108. Other examples of black box components may include the network component 208 (e.g., a network stack in the system 128) and the storage component 204 (e.g., database interfaces used by server-side scripting language frameworks).

Given the event-driven nature of the script-based managed runtime environment 202, the interrogative managed runtime environment interface 124 may include an aggregate set of event channels. By interposing on messages exchanged via these channels, the interactions between the various components in the script-based managed runtime environment 202 may be captured. However, black box components may not generate events for various changes to internal state. For example, the managed runtime component 108 may request the renderer component 210 to perform a Cascading Style Sheets ("CSS") animation that periodically modifies a user-visible DOM state. At any given moment, the computer-executable program 108 can synchronously request the renderer component 210 for a view of the DOM. However, these synchronous queries may hide that the renderer component 210 executes in parallel with the managed runtime component 108. The renderer component 210 may update the visual display without triggering script-side notifications, meaning that the script-side view of the DOM may desynchronize from the true DOM state inside the renderer component 210. This may be sufficient if it is desired to isolate and analyze the execution contexts 212-214. However, if it is desired to isolate and analyze the complete script-based managed runtime environment 202 (for a client-side web page or a Node application), missing events may impact correctness, performance, or both. Moreover, the script-based managed runtime environment 202 may include multiple execution contexts 212-214 and black box components. It is to be appreciated that a debugger for a web page may produce erroneous results if it lacks sufficient insights into rendering events. Further, logging and replay may be more efficient when the managed runtime environment interface event interface is semantically complete, such as the optional interrogative managed runtime environment interface 124.

To ensure this semantic completeness, the black box components may be modified so that these components export a wider variety of events. This approach may be referred to herein as interrogative virtualization, and includes interrogating the black box components to reveal specific parts of their hidden states. Interrogative virtualization extends the virtualization interface itself to improve the performance or correctness of operations upon managed runtime environments.

For example, if the script-based managed runtime environment 202 runs inside of a web browser (e.g., the system 128 may be a browser system), the renderer component 210 may be changed to report a tick count associated with an animation. The renderer component 210 may be configured to perform the animation and associate the tick count with the animation, where the tick count may be indicative of how close the animation is to a final repaint. Following this example, the tick count associated with the animation may be exposed to the script-based managed runtime environment 202 optionally via the optional interrogative managed runtime environment interface 124.

According to exemplary embodiments, if the script-based managed runtime environment 202 runs within a server-side Node deployment, the storage component 204 (e.g., the database stack) may be modified to enable logging objects that are read and written to storage. In one embodiment of the present disclosure, the network component 208 may download an external resource (e.g., the renderer component 210 may cause the network component 208 to download the external resource, etc.). An event indicative of the external resource being downloaded by the network component 208 may be exposed to the script-based managed runtime environment 202 optionally via optional the interrogative managed runtime environment interface 124. In another embodiment of the present disclosure, a callback list managed by the renderer component 210 may be exposed to the script-based managed runtime environment 202 optionally via optional the interrogative managed runtime environment interface 124.

Figure 3:
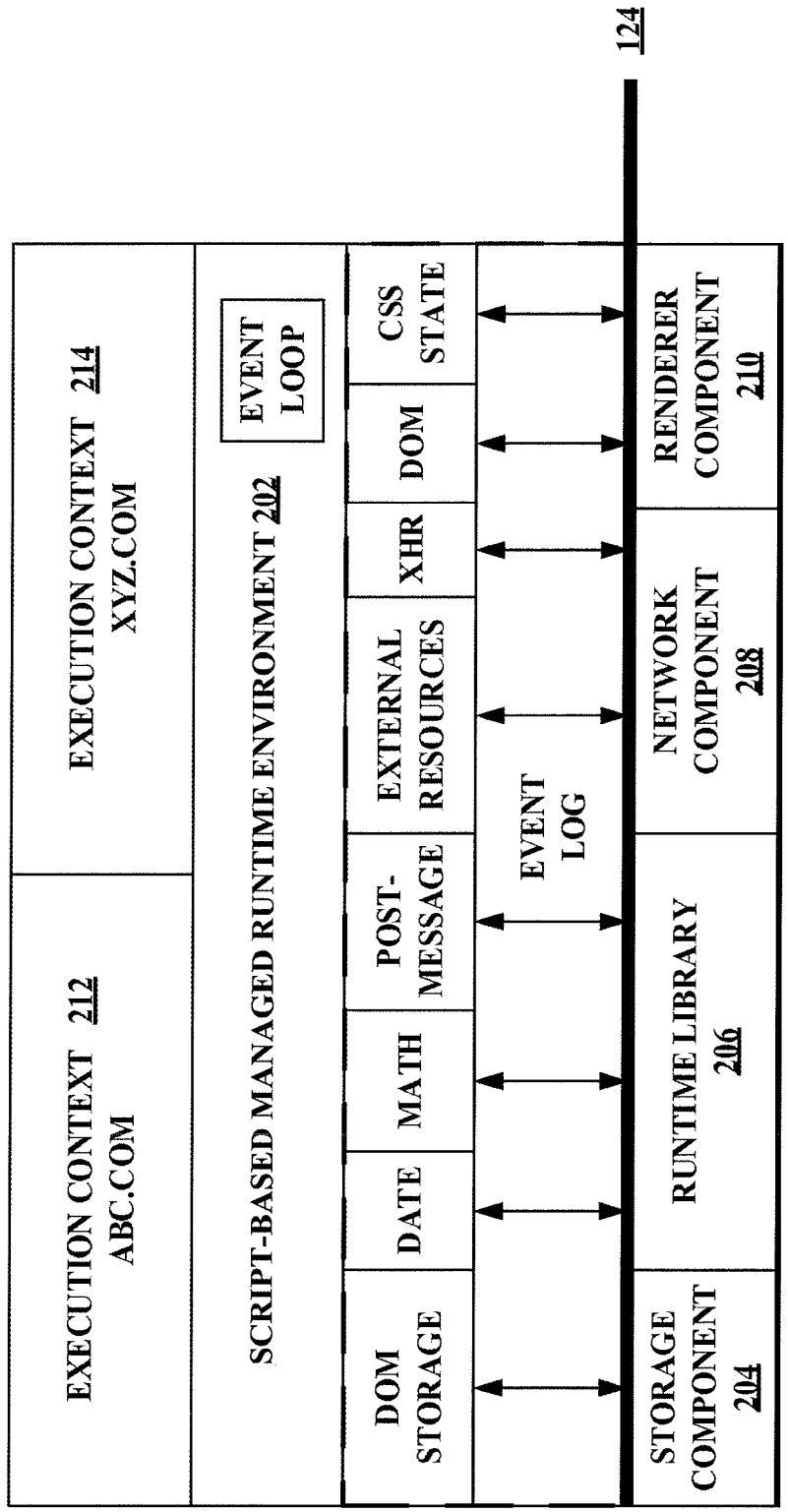
FIG. 3 depicts a script-based managed runtime environment, according to embodiments of the present disclosure.

FIG. 3 depicts a script-based managed runtime environment 202 (e.g., the script-based managed runtime environment 202 can be a JavaScript managed runtime environment, etc.), according to embodiments of the present disclosure. The script-based managed runtime environment 202 of FIG. 3 may include the execution contexts 212-214 (e.g., an execution context for abc.com and an execution context for xyz.com). Moreover, although not shown, it is contemplated that the script-based managed runtime environment 202 may further include the execution component 112, the snapshot component 114, the event logger component 120, and/or the analysis tool 126, such as a time travel debugger, automated failure root-cause analyzer, memory use analyzer, etc.

The script-based managed runtime environment 202 may support nested virtualization. In general, large interfaces may negatively impact security. Such interfaces may increase a threat surface that is visible to an attacker, and their rich semantics may cause defenders to reason about a variety of corner cases. Interrogative virtualization may add communication channels to the virtual interface, so at first glance, interrogative virtualization may seem to negatively impact security—there may be more opportunities for an attacker to escape an isolation container of the script-based managed runtime environment 202. However, the application-visible execution interface may not be conflated with a structural isolation boundary. The former is the interface that applications directly invoke, whereas the latter is the interface at which isolation and security are enforced.

As shown in FIG. 3, nested virtualization may be used to layer the optional interrogative managed runtime environment interface 124 (e.g., with a rich, wide interface) atop a smaller, low-level managed runtime environment interface.

The optional interrogative managed runtime environment 124 may be constructed by extending the script-based managed runtime environment 202 used by a web browser (e.g., the system 128 may be a browser system). Interfaces (e.g., the interface component 216) of the script-based managed runtime environment 202 to black box components, such as the storage component 204, the runtime library 206, the network component 208 (e.g., the network stack), and the renderer component 210, may be modified to include a number of interrogative APIs to expose hidden state. Optionally using the optional interrogative managed runtime environment interfaced 124, an efficient snapshotting mechanism (e.g., executed by the snapshot component 114) may be implemented for the script-based managed runtime environment 202.

Further, the optional interrogative managed runtime environment interface 124 may be augmented to record (e.g., via the event logger component 120) the non-deterministic events that enter and leave the script-based managed runtime environment 202. The result may be, for instance, a fully functional interrogative managed runtime environment interface 124 for the client-side of a web application.

A hidden state may be exposed via the optional interrogative managed runtime environment interface 124. The script-based managed runtime environment 202 may allow scripting language code to perform computations. To allow scripting language code to access local storage, exchange network traffic, and interact with the display, the script-based managed runtime environment 202 may communicate with external input-output ("I/O") modules. Runtime information about the I/O stack as well as the script-based managed runtime environment 202 may be captured via the optional interrogative managed runtime environment interface 124. As explained below, examples are present that may enable application-level semantics to be captured.

CSS/SVG Animation State: Browsers may use a dedicated thread to perform Cascading Style Sheets ("CSS") and Scalable Vector Graphics ("SVG") animations. These animations may run in parallel with script execution, and once triggered, the animations may run to completion (e.g., not paused or resumed by scripting language code).

Internally, the renderer component 210 may associate a tick count with each animation. The tick count may represent how close the animation is to its final repaint. The renderer component 210 may expose these tick counts to the script-based managed runtime environment 202 optionally via optional the interrogative managed runtime environment interface 124. The tick counts may be employed as logical clock values to synchronize the concurrent execution of the script-based managed runtime environment 202 and the renderer component 210. Moreover, the renderer component 210 may allow the script-based managed runtime environment 202 to pause or restart an animation from a given tick count optionally via optional the interrogative managed runtime environment interface 124.

Event Listeners: As described herein, the scripting language code may be event-driven. For instance, after initialization code of a page runs, subsequent code may be triggered by the arrival of events like key presses and mouse clicks. The scripting language code may register callback functions for events (e.g., using an addEventListener(evtName, callback) method). An application may register multiple callbacks for the same event. Callback lists may be managed by the renderer component 210. Such callback lists may not be accessed from a conventional managed runtime environment. In contrast, the script-based managed runtime environment 202 may access the callback lists managed by the renderer component 210, via the optional interrogative managed runtime environment interface 124. At snapshot time, the script-based managed runtime environment 202 may use the optional interrogative managed runtime environment interface 124 to enumerate and the callback lists and serialize such lists. At replay time, the script-based managed runtime environment 202 may use an interface of the renderer component 210 that restores the serialized lists.

External Resources: Objects in the DOM may refer to resources that are hosted on external servers. For example, in HyperText Markup Language ("HTML"), img elements refer to images, and iframe elements refer to HTML documents. To fetch such external content, the renderer component 210 may bypass the script-based managed runtime environment 202 and may directly communicate with the network component 208 (e.g., the network stack).

Accordingly, the network component 208 may expose a set of additional events to the script-based managed runtime environment 202 optionally via the optional interrogative managed runtime environment interface 124. Examples of such events exposed by the network component 208 may include an event that indicates when the network component 208 has finished downloading a resource. This allows the optional interrogative managed runtime environment interface 124 to be employed by the script-based managed runtime environment 202 to log the fetched value, as well as determine when the download completed with respect to other concurrent activities like execution of a managed runtime component (e.g., the managed runtime component 108).

Timers: Applications may generate and cancel one-time or recurring timers. According to exemplary embodiments, a setTimeout interface may be used by the script-based managed runtime environment 202 to generate a one-time timer, a setInterval interface may be used by the script-based managed runtime environment 202 to generate a recurring timer, a clearTimeout interface may be used by the script-based managed runtime environment 202 to cancel a one-time timer, and a clearInterval interface may be used by the script-based managed runtime environment 202 to cancel a recurring timer. The renderer component 210, for instance, may manage these timers. However, the renderer component 210 may not expose their state to conventional managed runtime environments.

These four interfaces may be interposed on from within the script-based managed runtime environment 202 to keep track of and expose active timers and their associated callbacks. According to another exemplary embodiment, the renderer component 210 may be modified to expose the timers to the script-based managed runtime environment 202 optionally via optional the interrogative managed runtime environment interface 124. By way of example, the script-based managed runtime environment 202 may add new active timers when the application creates them and timestamp their creation, and remove them when the application clears them. Further, when a one-time timer fires (e.g., upon expiration of the timer), the script-based managed runtime environment 202 may remove it from the active set. Moreover, pursuant to this exemplary embodiment, when an interval timer fires, the script-based managed runtime environment 202 may updates its timestamp.

State snapshots (e.g., captured by the snapshot component 114 of the script-based managed runtime environment 202) are now described in greater detail. To capture a snapshot of the script-based managed runtime environment 202, the snapshot component 114 may wait for each execution context 212-214 to pause. Each execution context 212-214 may be single-threaded, so pausing may occur when a local event loop has finished executing an event handler; stack state may not need to be captured since the context has no outstanding call chains. Once the execution contexts 212-214 are paused, the snapshot component 114 may capture black box states using the interrogative APIs of the interrogative managed runtime environment interface 124.

DOM Elements: A DOM element may have a set of string properties, a nested tree of DOM elements, and event listeners. The snapshot component 114 may capture this information using existing DOM interfaces and the managed runtime environment interface extensions. To resurrect the DOM state in a snapshot, each DOM object may be recreated using existing DOM interfaces (e.g., to create an element, to set an attribute, etc.).

The renderer component 210 may execute in parallel with the script-based managed runtime environment 202. However, the renderer component 210 may block during synchronous RPC exchanges with the script-based managed runtime environment 202. Accordingly, to avoid race conditions at snapshot time, the interface of the renderer component 210 may be extended to support a synchronous, no-op RPC that prevents the renderer component 210 from generating GUI events, repainting the screen, and so on. Using this no-op RPC, the snapshot component 114 may pause the renderer component 210 before serializing the state of the script-based managed runtime environment 202. This ordering may mitigate the execution contexts 212-214 from including references to stale renderer-side state.

Canvas Context: Canvas elements in the DOM may have an associated context object that includes the visual state of the canvas. The context object may be retrievable using an interface that gets a context object of a canvas. The snapshot component 114 may record each canvas's visual state as a bitmap. During snapshot inflation, the bitmap may be reapplied to restore the canvas to its previous state.

Heap: Managed languages may have garbage collectors that may efficiently walk the heap. The snapshot component 114 may identify live scripting language objects and serialize such objects. Primitive values like numbers and strings may be serialized. Moreover, arrays and objects may be serialized as bags of properties. Object references, including references to DOM objects, may be rewritten to point to a target object's location in a snapshot.

Event Queue: When a snapshot component 114 runs, execution contexts may be paused. However, the contexts may have non-empty event queues. Each event may include one or more callbacks to invoke, and one or more arguments to pass to the callbacks. The snapshot component 114 may serialize this information and place it in the snapshot.

CSS/SVG Animation State: The snapshot component 114 may record the tick count of active CSS and SVG animations. When the snapshot is later inflated, the interrogative interface may be used to resume each animation at the suspension-time tick count.

Timers: The snapshot component 114 may calculate and record the remaining time left on each active timer, the interval duration for recurring timers, and each timer's associated callback. One-time timers may be restored during snapshot inflation using an interface that sets a timeout. For recurring timers, the interface that sets the timeout may be used for initiation to resume the interrupted recurrence. Further, an interface that sets an interval may be used to resume the normal interval.

Non-deterministic event logging (e.g., which may be performed by the event logger component 120 of the script-based managed runtime environment 202) is now described in greater detail. While snapshots depict the script-based managed runtime environment 202 at particular moments in time, the non-deterministic event logs may describe how the script-based managed runtime environment 202 evolves between snapshots. Additionally, by using the optional interrogative managed runtime environment interface 124, event logs may grow slowly because, compared to raw x86 code, the scripting language code may be more deterministic. The event logger component 120 may use the optional interrogative managed runtime environment interface 124, during the execution of the managed runtime component, to log an event that is scheduled, a DOM tree difference between events for a DOM change, a tick count associated with an animation, a value change for a window state, a value from a synchronous source, a timer identifier, etc.

The following table provides an overview of the events that may be tracked optionally via the optional interrogative managed runtime environment interface 124. In the text below, these events are described in more detail.

| Category | Representative APIs | Log Strategy |
| --- | --- | --- |
| Event Scheduling | DOM Events, timers, XMLHttpRequest | Event logging |
| DOM Changes | Form fields, checkboxes | DOM tree diffs between events |
| CSS/SVG Animations | animation-* CSS properties | Log animation tick before every event, pause during events |
| Window State | Window size, scrollbar position | Log value changes before every event |
| External Resources | iframe src, img src | Log data in I/O subsystem |
| Synchronous Sources | Date, Math.random | Value logging |
| Timer IDs | setTimeout, setInterval | Value logging |
| XMLHttpRequest Status | XMLHttpRequest | Object diffs between events |

The event logger component 120 may serialize black box object references. Some non-deterministic events may refer to objects that reside in a black box component. For example, the network component 208 (e.g., the network stack) may expose a Hypertext Transfer Protocol ("HTTP") connection to the script-based managed runtime environment 202 using an XMLHttpRequest ("XHR") object. When an execution context does var xhr=new XMLHttpRequest( ), the network component 208 may create a new internal object, and then pass that C++ object from the network component 208 to the script-based managed runtime environment 202. Such hosted objects may have a scripting language wrapper, but may reside within the black box component.

Hosted objects may subsequently be referenced by events. For example, when HTTP data arrives, the network component 208 may pass an event object to the execution context; the target property of the event may be the XMLHttpRequest object that was created via a new operator, where the new operator creates an instance of an object type. At logging time, the identity of the XMLHttpRequest object may be recorded in the event. According to exemplary embodiments, edge relationships between objects in a heap graph may be preserved.

Object Tagging: In general, a hosted object may be created via the new operator before it may appear in an event. For example, an XMLHttpRequest object may be created and initialized before it may generate network events. At logging time, the interrogative managed runtime environment interface 124 may interpose on the new operator and assigns a unique integer identifier to each hosted object. By interposing on the event interface, script-based managed runtime environment 202 may log the identifier of the hosted object in each event.

Later, at replay time, the optional interrogative managed runtime environment interface 124 may be used by the script-based managed runtime environment 202 to assign identifiers as above; hosted objects may receive the same logging-time identifiers, since replay is deterministic. At replay time, the optional interrogative managed runtime environment interface 124 also may be used by the script-based managed runtime environment 202 to maintain a map that associates an identifier with its hosted object. When replaying an event, the script-based managed runtime environment 202 may use the optional interrogative managed runtime environment interface 124 to extract the hosted object identifier from the event log, fetch the associated hosted object from the map, and attach that hosted object to the event that is passed to the execution context.

DOM Paths: Object tagging typically may not work for DOM elements, since a DOM element may be referenced by an event without a prior scripting language call to the new operator. For example, HTML of a page may register a scripting language click handler for a button element. When the button is clicked, the browser may generate an event which references the button. Following this illustration, the execution context may not have previously seen the DOM element, and thus, may not have been tagged.

To solve the foregoing, the optional interrogative managed runtime environment interface 124 may be used to log a DOM element using the element's path in the HTML tree. For example, the DOM path {2,5} may represent the DOM node that is found by examining the second child of the <html> tag, and the fifth child of that tag.

Moreover, during execution, various non-deterministic interfaces may schedule events. As a result, the order of events is non-deterministic, and is to be controlled during program replay.

Logging Events: An event loop of the script-based managed runtime environment 202 may log each event. A type of an event may be a string such as "mouseclick", and may be logged. Moreover, a target node of an event may be logged using object identifiers or DOM paths. A callback function of an event may be logged as the integer index of the callback in a callback list of the target node.

Unlike most events, timers may not have an event object; timers may have a callback function. When a timer fires (e.g., at expiration of the timer), the unique identifier of a time may be logged. The optional interrogative managed runtime environment interface 124 may use this identifier to lookup the callback function associated with the timer during replay.

Replaying Events: During replay of the script-based managed runtime environment 202, the event loop may ignore real events that are generated by the browser. Instead, the script-based managed runtime environment 202 may control script execution directly, using the event log.

Moreover, scripting language code may force updates to a state of the renderer component 210 (e.g., by dynamically adding an image to the DOM tree). However, an update to the renderer component 210 may not be initiated by an execution context. For example, if the user types a string into a textbox, or selects an item in a drop-down list, a state of the renderer component 210 may be updated. The optional interrogative managed runtime environment interface 124 may be used to capture these state changes in the event log.

DOM Elements: The renderer component 210 may be frozen while an execution context is executing an event handler. During this time, scripting language code may modify a state of the renderer component 210. As a result, GUI changes that are not initiated by an execution context may occur between events. Accordingly, the script-based managed runtime environment 202 may log DOM changes that occur between events. Since the DOM is a tree that mirrors an HTML structure of a page, the optional interrogative managed runtime environment interface 124 may log the DOM changes as a tree diff. At replay time, the script-based managed runtime environment 202 may replay the changes on live GUI objects.

CSS/SVG Animations: Modern browsers may execute CSS/SVG animations in parallel with script execution. The optional interrogative managed runtime environment interface 124 extensions may be used to pause animations while scripting language code executes, and to log the tick counts of active animations as they play. While this changes the semantics of animations in a target browser, it is noted that some browsers do not play animations in parallel with script execution. During replay, the optional interrogative managed runtime environment interface 124 extensions may be used to explicitly reset animations to appropriate tick counts before dispatching an event from the log.

Window State: A global window object may include a number of properties related to the status of the GUI, such as scroll bar position, currently active DOM element, and size of the browser viewport. Like with animations, the optional interrogative managed runtime environment interface 124 may log these values prior to event execution, and may reset these values prior to dispatching a replayed event.

External Resources: DOM elements may refer to external network resources. For example, img elements refer to images, and iframe elements refer to HTML files. Using the interrogative extensions to the network component 208, the optional interrogative managed runtime environment interface 124 may record external network fetches at logging time, and may return the logged data at replay time.

It is further contemplated that the GUI may not be the only source of non-determinism for an execution context. Below are various examples of non-GUI sources of non-determinism that may be logged with or without the optional interrogative managed runtime environment interface.

Synchronous sources: The optional interrogative managed runtime environment interface 124 may log return values from the non-deterministic functions Date( ) and Math.random( ). The optional interrogative managed runtime environment interface 124 may also log read values from the localStorage interface and from Cookies. During replay, the optional interrogative managed runtime environment interface 124 may interpose on these interfaces to return logged values.

Timer IDs: Each timer created with the setInterval interface and the setTimeout interface may have a unique identifier associated with it, which the renderer component 210 may determine. The optional interrogative managed runtime environment interface 124 may log identifier values returned from these interfaces. During replay, the optional interrogative managed runtime environment interface 124 may interpose on these interfaces to return the same identifiers, and may interact with the managed runtime environment interface timer extensions to update its active timer state.

XMLHttpRequest: Like DOM elements, XMLHttpRequest objects may be frozen while an event executes. The optional interrogative managed runtime environment interface 124 may maintain a list of the live XMLHttpRequest objects, and may check them for property changes before a new event is dispatched. If properties of an object have changed, the event log may record the changes as a diff from the previous state of the object. During replay, the optional interrogative managed runtime environment interface 124 may use the hosted object map to find the relevant XMLHttpRequest and may apply the deltas from the log before handing the associated event to an execution context.

Pursuant to exemplary embodiments, the script-based managed runtime environment 202 may be configured to perform an execution of the managed runtime component to a causal event based on the snapshot(s) and/or the event logs. According to exemplary embodiments, the script-based managed runtime environment 202 may be a JavaScript virtual managed runtime environment that may include the analysis tool 126, such as a time travel debugger, automated failure root-cause analyzer, memory use analyzer, etc. The analysis tool 126 and/or the optional interrogative managed runtime environment interface 124 may enable a forward-stepping and/or reverse-stepping to a causal event. For instance, JavaScript programs frequently utilize callbacks via timers, XHR, etc. to implement event handling. Similar features exist in other programming languages such as the async construct for C#.

In exemplary embodiments, snapshots and/or event logs may include identities of callbacks and corresponding logical times at which the callbacks are set during the execution of the computer-executable program. Thus, the identities of the callbacks and the corresponding logical times at which the callbacks are set during the execution may be stored. The identities of the callbacks and the corresponding logical times can be exposed to the script-based managed runtime environment 202 during the execution of the managed runtime component. Further, the analysis tool 126, such as a time travel debugger, automated failure root-cause analyzer, memory use analyzer, etc., may replay at least a portion of the execution of the managed runtime component based at least in part on the identities of the callbacks and the corresponding logical times. For instance, the analysis tool 126 may perform a forward and/or a reverse execution of the computer-executable program to a causal event based at least in part on the identities of the callbacks and the corresponding logical times.

Figure 4:
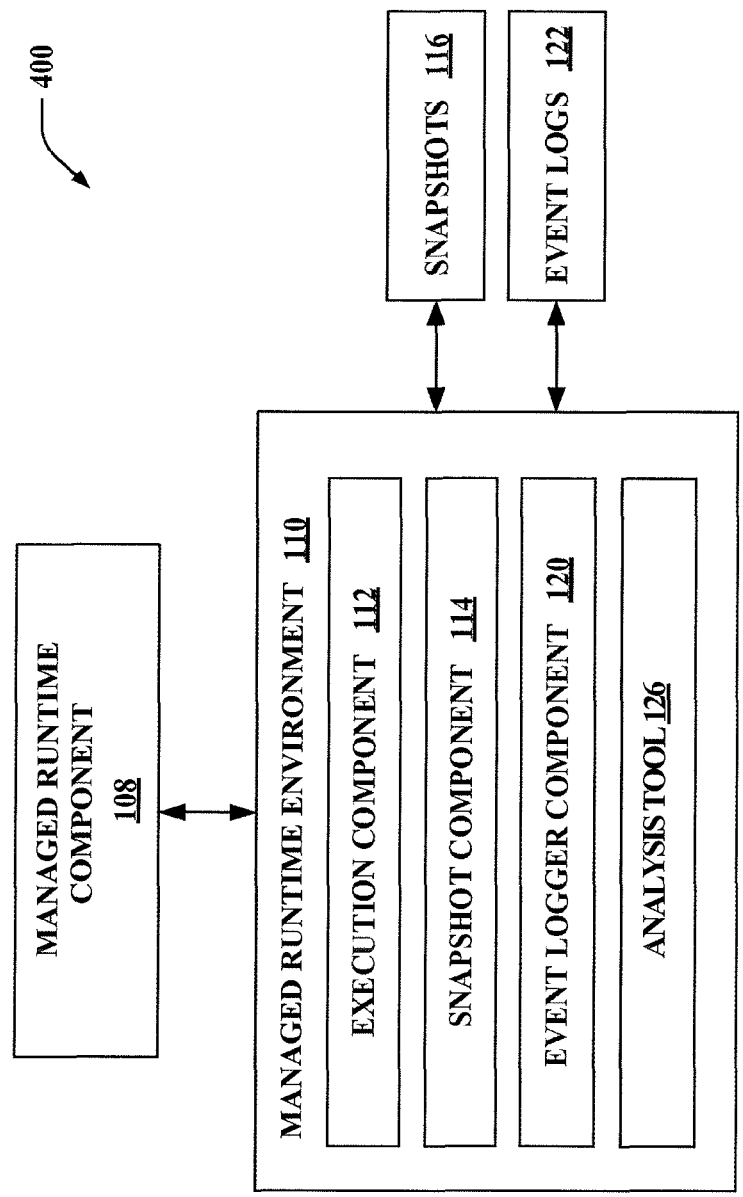
FIG. 4 depicts a system that performs application record and replay, such as time travel debugging, automated failure root-cause analysis, and/or memory use analysis, according to embodiments of the present disclosure.

FIG. 4 depicts a system 400 that performs application record and replay, such as time travel debugging, automated failure root-cause analysis, and/or memory use analysis, according to embodiments of the present disclosure. The system 400 may include the managed runtime environment 110, the managed runtime component 108, the snapshots 116, and the event logs 122. The managed runtime environment 110 may include the execution component 112, the snapshot component 114, the event logger component 120, and the analysis tool 126, such as a time travel debugger, automated failure root-cause analyzer, memory use analyzer, etc. For example, a time travel debugger 126 may be a time travel debugger for a web browser (e.g., when the system 128 is a browser system) and/or for a cloud-based system, server system, and/or client-side system.

In the embodiments described below, the analysis tool 126 may be a time travel debugger, which may be referred to as time travel debugger 126. The time travel debugger 126 may receive an input (e.g., from a developer) that sets a breakpoint in the managed runtime component 108. The time travel debugger 126 may enable traveling forwards and/or backwards in time from that point to previously executed statements. The time travel debugger 126 may provide both replay fidelity and performance. By optionally leveraging the optional interrogative managed runtime environment interface 124, the time travel debugger 126 may handle interactions with black boxes while still providing efficient logging and replay.

The time travel debugger 126 may use the snapshots 116 captured by the snapshot component 114 and the event logs 122 captured by the event logger component 120. The time travel debugger 126 may re-inflate a snapshot S to return to a time that is represented by S. To return to a time t that is between two snapshots, the time travel debugger 126 may load the last snapshot temporally preceding t, and then may replay the event logs 122 until t is reached.

During execution of the managed runtime component 108 by the execution component 112 (e.g., before an analysis tool session using record and replay components has started), the record and replay components and/or analysis tool 126 may enable the event logger component 120 to capture the non-deterministic event logs 122 and may enable the snapshot component 114 to create snapshots 116 (e.g., at regular intervals, etc.). The snapshots 116 may be created at pause points between events; since handlers may run for a few milliseconds, the snapshots 116 may be captured at regular intervals. The snapshot interval may set an upper bound on a cost to seek to an arbitrary point in the execution of the managed runtime component 108.

As mentioned above, the event logger component 120 may capture the non-deterministic event logs 122. Based on use of semantic knowledge about the immutability of certain types in a scripting language eager copies into an event log may be eliminated. In exemplary embodiments, the scripting language may be JavaScript, which has six types including, Object, Number, String, Boolean, Null, and Undefined. Objects may include arrays, functions, and ordinary objects. Numbers may be integers or floating point or the special values NaN and Infinity. Strings may include an empty string, etc. In the exemplary embodiments, the string types may be immutable, i.e., the content of string may not be modified after it is created.

Traditionally, when capturing an event, an event logger component 120 may capture the non-deterministic event logs. Before a string is created, bytes from a string value may be copied into a buffer. Then a scripting language string may be created from this buffer, which may be returned to the application. In this traditional embodiment the contents of a string are eagerly, and redundantly, copied into the log and will consume at least a stringLength bytes of space.

Below is exemplary pseudocode of an unmodified, traditional event logging.

```
1    JsValue* JsPointerToString(const char* stringValue, int
         stringLength) {
2           /*copy stringValue byte buffer into event log*/
3           eventLog->RecordJsRTCreateString__Copy(stringValue,
                stringLength);
4
5           JSValue* string =
    JavascriptString::NewCopyBuffer(stringValue, stringLength);
6           return string;
7    }
```

According to embodiments of the present disclosure, when capturing an event, an event logger component 120 may capture the non-deterministic event based on an immutable copy optimized, version of capturing. In embodiments of the present disclosure, contents of a stringValue may not eagerly be copied. Rather, embodiments of the present disclosure may begin by creating an immutable scripting language string (e.g., a JavascriptString), which may be returned.

A call to NewCopyBuffer may make a copy of the contents of a stringValue into an immutable buffer. Instead of making a copy of this data, a GC reference may be added to prevent collection of the scripting language string (i.e., JavaScript String) previously created. Thus, a pointer may be copied into the event log. Then, at some later point in time either (i) the event from the event log may be removed, in which case the GC reference may simply be removed so the string may be collected, or (ii) if it is decided to write the event to an event log, which may reside on a disk and/or network, then the contents of the scripting language string (i.e., JavaScript String) may be read to serialize the needed data. In other words, a string may be created, which saves a pointer to immutable JavaScript string. Accordingly, a copy of an additional sizeof(void*) bytes into the event log may only be required, and the created scripting language string (i.e., the JavaScript String) may be kept live until the event is discarded.

In comparison, exemplary psuedocode of copying of an event of the script-based managed runtime environment 202 to an event log is now set forth.

```
1    JsValue__JsPointerToString(const char* stringValue, int stringLength) {
2        JsValue* string = JavaScriptString::NewCopyBuffer(stringValue,
    stringLength);
3
4            /*pin immutable string reference and save ptr in event log*/
5            eventLog->RecordJsRTCreateString__ImmutableOpt(string);
6            return string;
7    }
```

In another embodiment of the present disclosure, runtime support in a managed runtime environment, such as the ability to create copy-on-write ("COW") objects, may be used to eliminate the need to eagerly copy file contents that are read into the event log. In the scenario in which an application only reads from the buffer returned, the embodiment may entirely eliminate the redundant copying of all file data.

Traditionally, when capturing an event, an event logger component may capture the non-deterministic event logs. In some managed runtime environments, file reading may be asynchronous, and the relevant code for reading may be spread over several functions. For example, in a JavaScript environment, both JavaScript library code and native C++ code in the core runtime may be used. To execute a call readFile(fd, callback), a JavaScript runtime environment may first allocate a JavaScript Buffer to hold a block of data from the file. Then, JavaScript runtime environment may invoke a native C++ method to perform the actual file reading. A NativeFSRead code may first notify the event log that the buffer is the target of an asynchronous read operation, and then may use a library, such as libuv, to perform the actual I/O. When the I/O operation completes and the file data is in the buffer, the library, such as libuv, may then invoke an After callback in native code. Traditionally, the After callback may copy the data from the buffer into the event log. Thus, traditionally, the contents of the buffer are eagerly, and likely redundantly, copied into the event log. As a result, the copying may consume at least realSize bytes of space.

Below is exemplary pseudocode of an unmodified, traditional event logging for a readFile with standard ArrayBuffer objects.

```
1    //JavaScript library
2    function JsFileRead(fd, size, cb) {
3        /*allocate buffer for the file contents in JavaScript code*/
4        buffer = Buffer.allocUnsafeSlow(kReadFileBufferLength);
5        InvokeNativeFSRead(fd, buffer, cb);
6    }
7    ...
8
9    //C++ implementation
10   void NativeFSRead (int fd, JsBuffer buffer, JsFunction cb) {
11       /*register the Asynchronous operation on the buffer*/
12       eventLog->AsyncModRegister(buffer);
13       uv__fs__read__exec(fd, buffer, kReadFileBufferLength,
             After, cb);
14   }
15
16   void After(JsBuffer buffer, int realSize, JsFunction cb) {
17       /*copy buffer data into the event log*/
18       eventLog->AsyncModNotify(buffer, realSize);
19       InvokeCallBack(cb, undef, buffer);
20   }
```

According to embodiments of the present disclosure, when capturing an event, an event logger component 120 may capture the non-deterministic event base on an immutable copy optimized, version of recording. In the exemplary embodiments, contents of the buffer may not be eagerly copied. For example, event logging may begin by creating a copy-on-write ("COW") version of a Buffer object. Initially, an entire object may be marked as not requiring a COW. Then, instead of making a copy of this data eagerly, the entire object may be marked as requiring COW, and a pointer to the buffer may be saved into the event log. To ensure the COW buffer does not degrade performance, a single flag may be used for the full contents. If user code attempts to modify the contents, the contents may immediately be copied into the event log. As with the immutable optimization discussed above, at some later point in time, the event may either be discarded from the event log, in which case we simply remove the GC reference so the buffer can be collected, or if a write of the event log to disk and/or network is determined to be needed, then the contents of the buffer may be read to serialize the needed data. Thus, in the common case when the user code does not modify the contents of the returned buffer embodiments may only require copying an additional sizeof(void*) bytes into the event log and keeps the created Buffer live until the event is discarded.

In comparison, exemplary psuedocode of copying of an event of the script-based managed runtime environment 202 to an event log is now set forth.

```
1   //JavaScript library
2   function JsFileRead(fd, size, cb) {
3       /*allocate copy-on-write buffer for file contents in JavaScript code*/
4       buffer = Buffer.allocUnsafeSlow__COW(kReadFileBufferLength);
5       InvokeNativeFSRead(fd, buffer, cb);
6   }
7   ...
8
9   //C++ implementation
10  void NativeFSRead(int fd, JsBuffer buffer, JsFunction cb) {
11      /*register asynchronous operation on the buffer and disable copy-on-write*/
12      eventLog->AsyncModRegister(buffer);
13      uv__fs__read__exec(fd, buffer, kReadFileBufferLength, After, cb);
14  }
15
16  void After(JsBuffer buffer, int realSize, JsFunction cb) {
17      /*set the copy-on-write callback to copy data if modified by user code*/
18      eventLog->Notify__OnCOW(buffer, realSize);
19      InvokeCallBack(cb, undef, buffer);
20  }
```

Because the recording and/or replaying of an entire run of an application may not be required, a relatively small time window of an application may be recorded, which may in cases where an application has extensive interactions with high-volume external data sources, such as file input/output ("I/O") and/or network I/O, save a cost of recording these interactions.

Further, because of the nature of managed runtime environments, there is a deep understanding of values in the languages and controls which buffers are passed to OS level operations. Due to the managed runtime environment, data may be preserved at known locations for the application, which means that if an event needs to be saved, the original data copied later, as needed. Thus, a cost of automatically recording these interactions is avoided and the data may be preserved.

Figure 5:
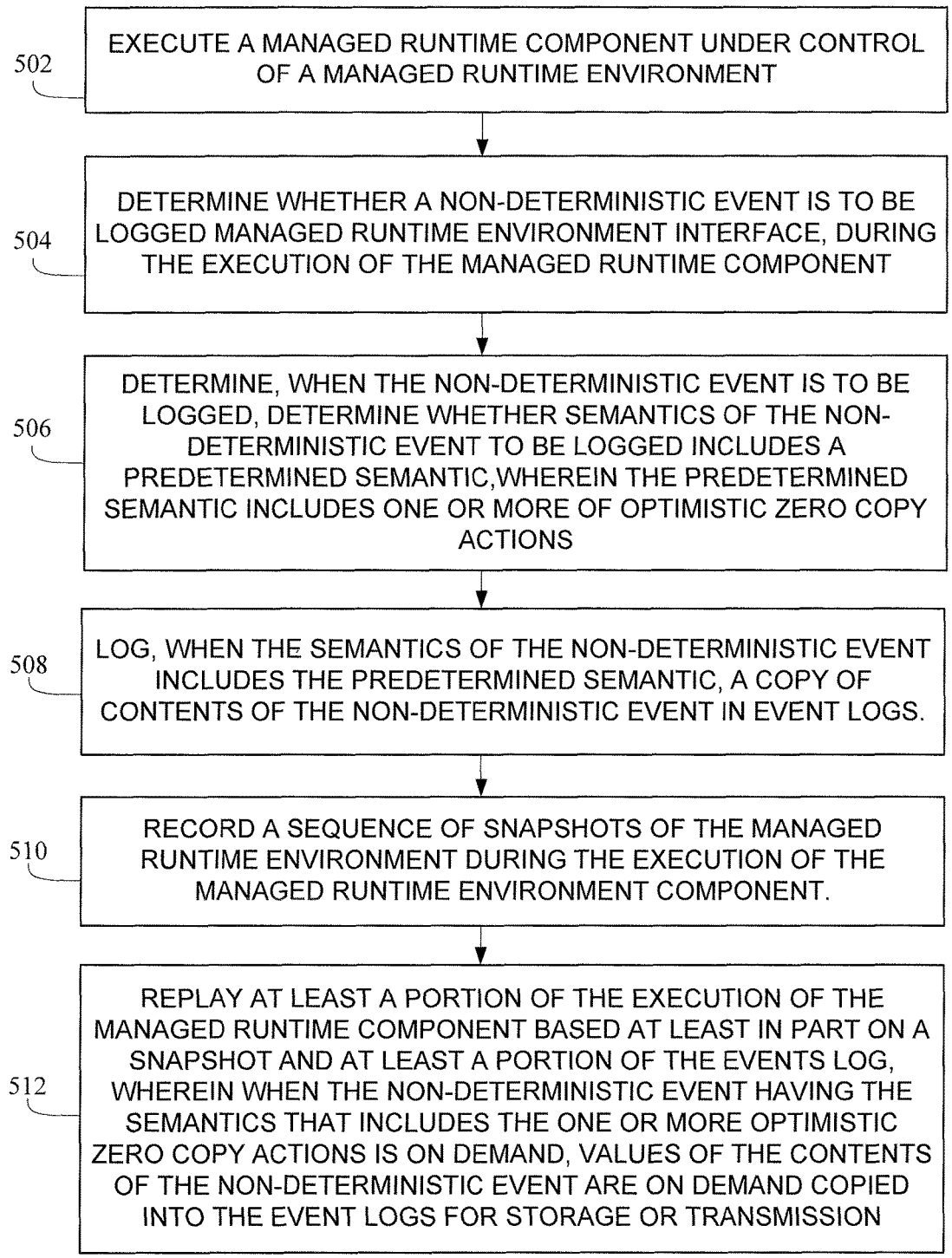
FIG. 5 depicts a method for using managed runtime environment semantics to optimize record and replay frameworks, according to embodiments of the present disclosure.
Figure 6:
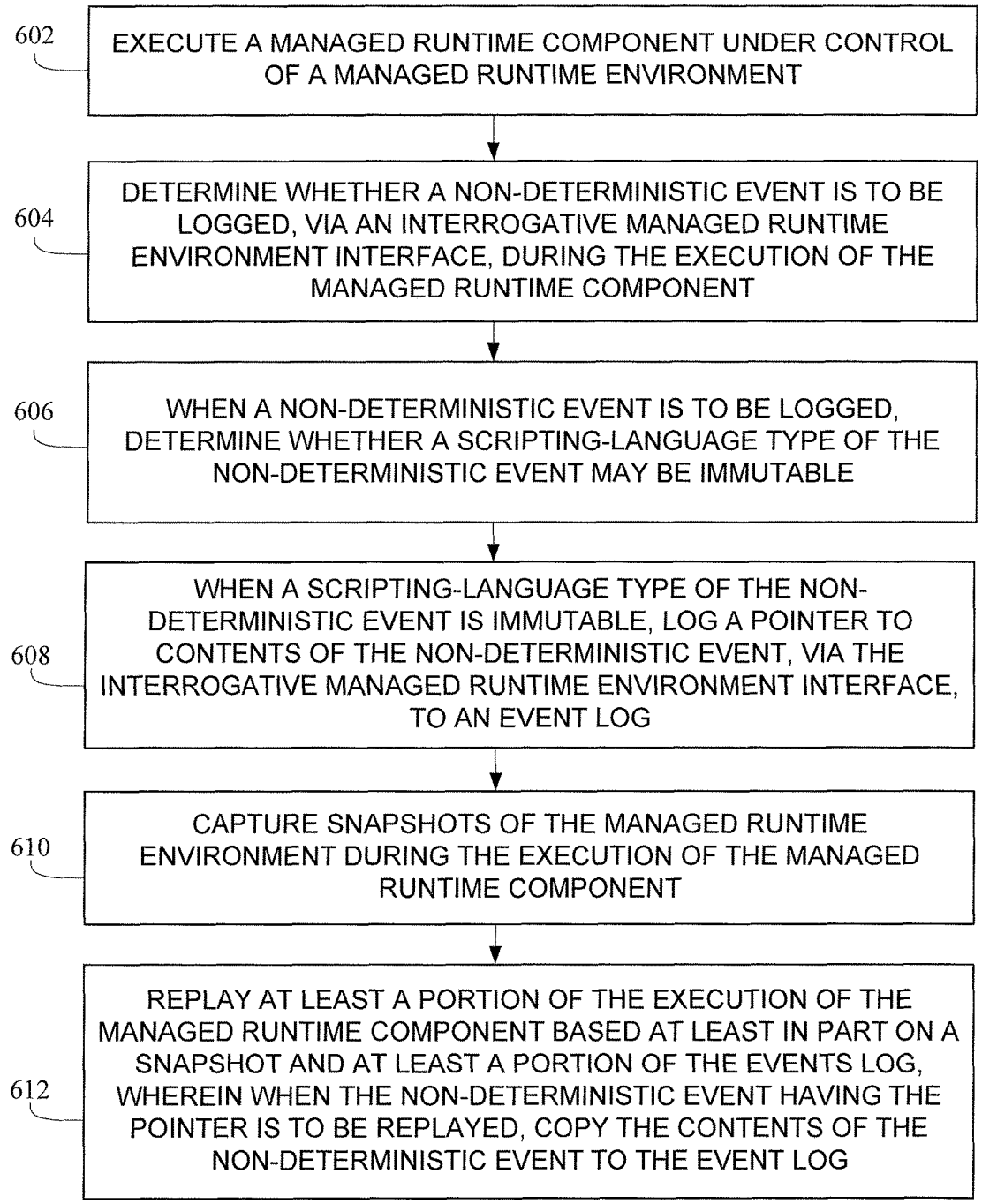
FIG. 6 depicts another method for using managed runtime environment semantics to optimize record and replay frameworks, according to embodiments of the present disclosure.
Figure 7:
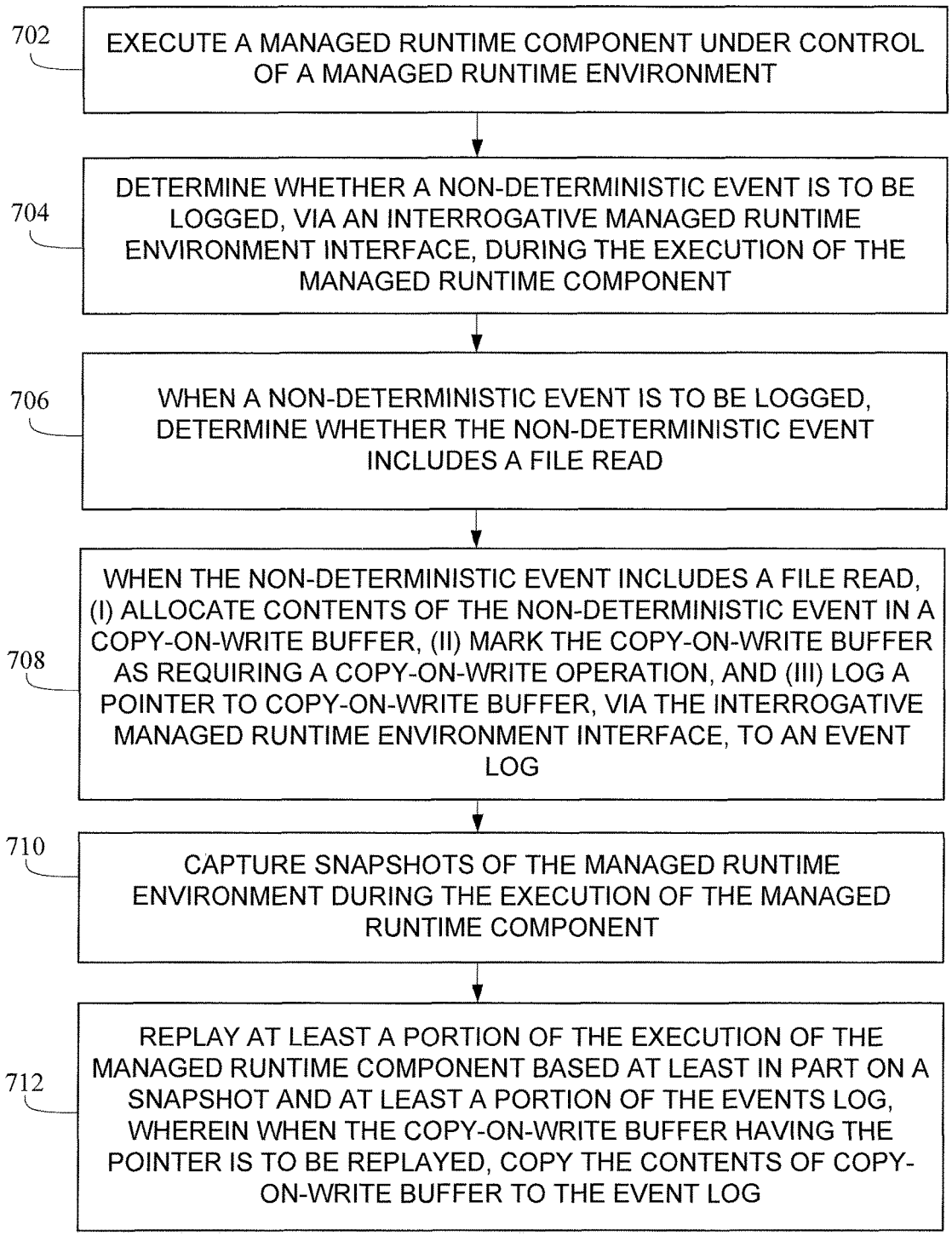
FIG. 7 depicts yet another method for using managed runtime environment semantics to optimize record and replay frameworks, according to embodiments of the present disclosure.

FIGS. 5-7 depict an exemplary method for using managed runtime environment semantics to optimize record and replay frameworks, according to embodiments of the present disclosure. While the methods are shown and described as being a series of acts that are performed in a sequence, it is to be understood and appreciated that the methods are not limited by the order of the sequence. For example, some acts may occur in a different order than what is described herein. In addition, an act may occur concurrently with another act. Further, in some embodiments, not all acts may be required to implement methods described herein.

Moreover, the acts described herein may be computer-executable instructions that may be implemented by one or more processors and/or stored on a non-transitory computer-readable medium or media. The computer-executable instructions may include a routine, a sub-routine, programs, a thread of execution, and/or the like. Still further, results of acts of the methods may be stored in a non-transitory computer-readable medium, displayed on a display device, and/or the like.

FIG. 5 depicts a method 500 for using managed runtime environment semantics to optimize record and replay frameworks, according to embodiments of the present disclosure. Method 500 may begin at step 502, in which a managed runtime component may be executed under control of a managed runtime environment. For example, the managed runtime environment may interact with a system, such as a browser system, a cloud-based system, a server system, a client-side system, etc., during execution of the managed runtime component. Additionally, and/or alternatively, the optional interrogative managed runtime environment interface may be between the managed runtime environment and the system. At step 504, the method may determine whether a non-deterministic event is to be logged during the execution of the managed runtime component. The non-deterministic event may be logged as part of event logs.

When a non-deterministic event is to be logged, an event logger component of the managed runtime environment may determine whether semantics of the non-deterministic event to be logged includes a predetermined semantic at step 506. The predetermined semantic may be one or more of optimistic zero copy actions, such as an immutable semantic pointer save and/or a copy-on-write ("COW") semantic pointer save. When the semantics of the non-deterministic event includes the predetermined semantic, a copy of contents of the non-deterministic event may be logged to an event log at step 508. For example, when contents of a string in JavaScript are to be logged in an events log, a copy and/or a reference (i.e., a pointer) to the contents of the string is stored to the events log rather the contents of the string. The pointer to the contents of the string may have a smaller size than the contents of the string.

At step 510, snapshots of the managed runtime environment may be recorded during the execution of the managed runtime component. The snapshots may be recorded via the interrogative managed runtime environment interface. At step 512, at least a portion of the execution of the managed runtime component may be replayed based at least in part on a snapshot and at least a portion of the event log, wherein when the non-deterministic event having the semantics that includes the one or more optimistic zero copy actions is on demand, values of the contents of the non-deterministic event may be on demand copied to the event logs for storage or transmission.

FIG. 6 depicts a method 600 for using managed runtime environment semantics to optimize record and replay frameworks, according to embodiments of the present disclosure.

Specifically, as shown in FIG. 6, immutable semantics pointer save of a managed runtime environment may be used to optimize record and replay frameworks.

Method 600 may begin at step 602, in which a managed runtime component may be executed under control of a managed runtime environment. For example, the managed runtime environment may interact with a system, such as a browser system, a cloud-based system, a server system, a client-side system, etc., during execution of the managed runtime component. Additionally, and/or alternatively, the optional interrogative managed runtime environment interface may be between the managed runtime environment and the system. At step 604, the method may determine whether a non-deterministic event is to be logged during the execution of the managed runtime component. The non-deterministic event may be logged as part of event logs.

When a non-deterministic event is to be logged, an event logger component of the managed runtime environment may determine whether semantics of the non-deterministic event to be logged includes a predetermined semantic, wherein the predetermined semantic includes one or more of an immutable semantic pointer save at step 606. For example, an event logger component may determine whether a scripting-language type of the non-deterministic event may be immutable. In an example embodiment, as discussed above, the type may include a string in JavaScript.

When the semantics of the non-deterministic event includes the predetermined semantic, the method may log a copy of contents of the non-deterministic event in event logs at step 608. For example, when the scripting-language type of the non-deterministic event is immutable, a pointer to contents of the non-deterministic event may be logged in event logs. The pointer to the non-deterministic event may have a smaller size than the content of the non-deterministic event At step 610, snapshots of the managed runtime environment may be recorded during the execution of the managed runtime component. The snapshots may be recorded via the interrogative managed runtime environment interface. At step 612, at least a portion of the execution of the managed runtime component may be replayed based at least in part on a snapshot and at least a portion of the event logs, wherein when the non-deterministic event having semantics that includes the immutable semantic pointer save is on demand is to be replayed, values of the contents of the non-deterministic event may be on demand copied to the event logs for storage or transmission.

FIG. 7 depicts a method 700 for using managed runtime environment semantics to optimize record and replay frameworks, according to embodiments of the present disclosure. Specifically, as shown in FIG. 7, a copy-on-write ("COW") semantic pointer save of a managed runtime environment may be used to optimize record and replay frameworks.

Method 700 may begin at step 702, in which a managed runtime component may be executed under control of a managed runtime environment. For example, the managed runtime environment may interact with a system, such as a browser system, a cloud-based system, a server system, a client-side system, etc., during execution of the managed runtime component. Additionally, and/or alternative, the interrogative managed runtime environment interface may be between the managed runtime environment and the system. At step 704, the method may determine whether a non-deterministic event is to be logged during the execution of the managed runtime component. The non-deterministic event may be logged as part of event logs.

When a non-deterministic event is to be logged, an event logger component of the managed runtime environment may determine whether semantics of the non-deterministic event to be logged includes a predetermined semantic, wherein the predetermined semantic includes one or more of a copy-on-write ("COW") semantic pointer save at step 706. For example, an event logger component may determine whether the non-deterministic event may include a file read. For example, a file read may include a file being read from a disk and/or a network.

When the semantics of the non-deterministic event includes the predetermined semantic, the method may log a copy of contents of the non-deterministic event in event logs at step 708. For example, when the non-deterministic event includes a file read, (i) contents of the non-deterministic event may be allocated in a copy-on-write buffer, (ii) the copy-on-write buffer may be marked as requiring a copy-on-write operation, and (iii) a pointer to copy-on-write buffer may be logged to event logs. The pointer to the copy-on-write buffer may have a smaller size than the content of the non-deterministic event.

At step 710, snapshots of the managed runtime environment may be recorded during the execution of the managed runtime component. The snapshots may be recorded via the interrogative managed runtime environment interface. At step 712, at least a portion of the execution of the managed runtime component may be replayed based at least in part on a snapshot and at least a portion of the event logs, wherein when the non-deterministic event having the semantics that includes the COW semantic pointer save is on demand, values of the contents of the non-deterministic event are on demand copied into the event logs for storage or transmission.

Figure 8:
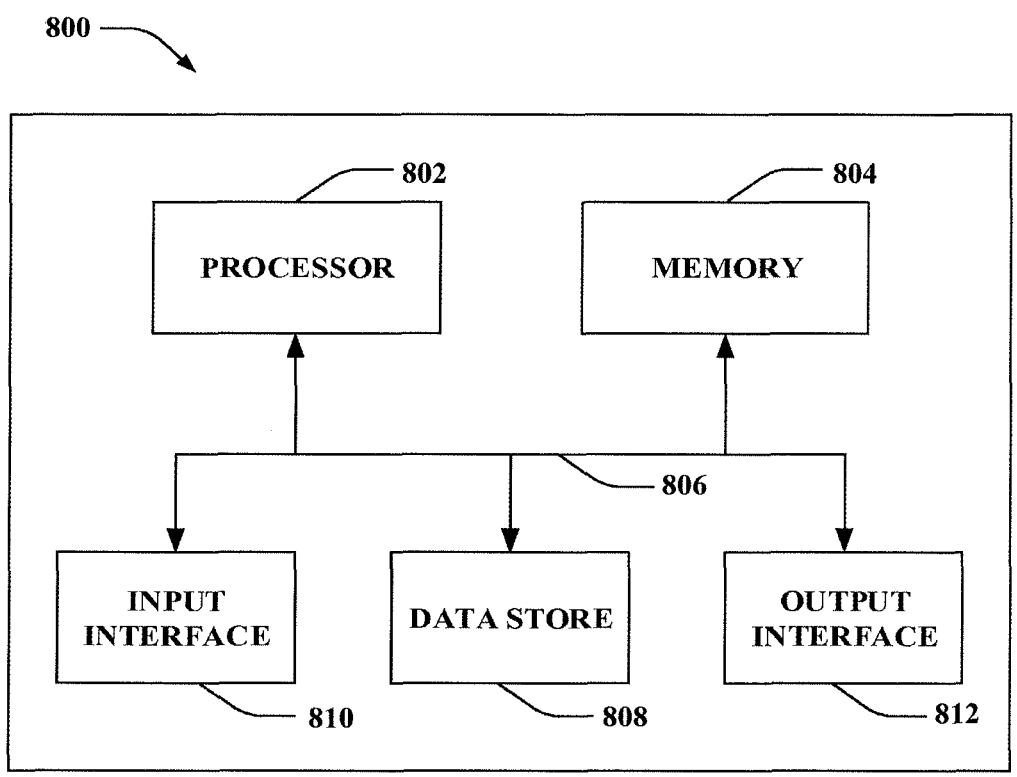
FIG. 8 depicts a high-level illustration of an exemplary computing device that may be used in accordance with the systems, methods, and computer-readable media disclosed herein, according to embodiments of the present disclosure.

FIG. 8 depicts a high-level illustration of an exemplary computing device 800 that may be used in accordance with the systems, methods, and computer-readable media disclosed herein, according to embodiments of the present disclosure. For example, the computing device 800 may be used in a system that performs recording and replaying of snapshot of applications including time travel debugging, according to embodiments of the present disclosure. The computing device 800 may include at least one processor 802 that executes instructions that are stored in a memory 804. The instructions may be, for example, instructions for implementing functionality described as being carried out by one or more components discussed above or instructions for implementing one or more of the methods described above. The processor 802 may access the memory 804 by way of a system bus 806. In addition to storing executable instructions, the memory 804 may also store snapshots, event logs, and so forth.

The computing device 800 may additionally include a data store 808 that is accessible by the processor 802 by way of the system bus 806. The data store 808 may include executable instructions, snapshots, event logs, etc. The computing device 800 may also include an input interface 810 that allows external devices to communicate with the computing device 800. For instance, the input interface 810 may be used to receive instructions from an external computer device, from a user, etc. The computing device 800 also may include an output interface 812 that interfaces the computing device 800 with one or more external devices. For example, the computing device 800 may display text, images, etc. by way of the output interface 812.

It is contemplated that the external devices that communicate with the computing device 800 via the input interface 810 and the output interface 812 may be included in an environment that provides substantially any type of user interface with which a user can interact. Examples of user interface types include graphical user interfaces, natural user interfaces, and so forth. For example, a graphical user interface may accept input from a user employing input device(s) such as a keyboard, mouse, remote control, or the like and may provide output on an output device such as a display. Further, a natural user interface may enable a user to interact with the computing device 800 in a manner free from constraints imposed by input device such as keyboards, mice, remote controls, and the like. Rather, a natural user interface may rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 800 may be a distributed system. Thus, for example, several devices may be in communication by way of a network connection and may collectively perform tasks described as being performed by the computing device 800.

Figure 9:
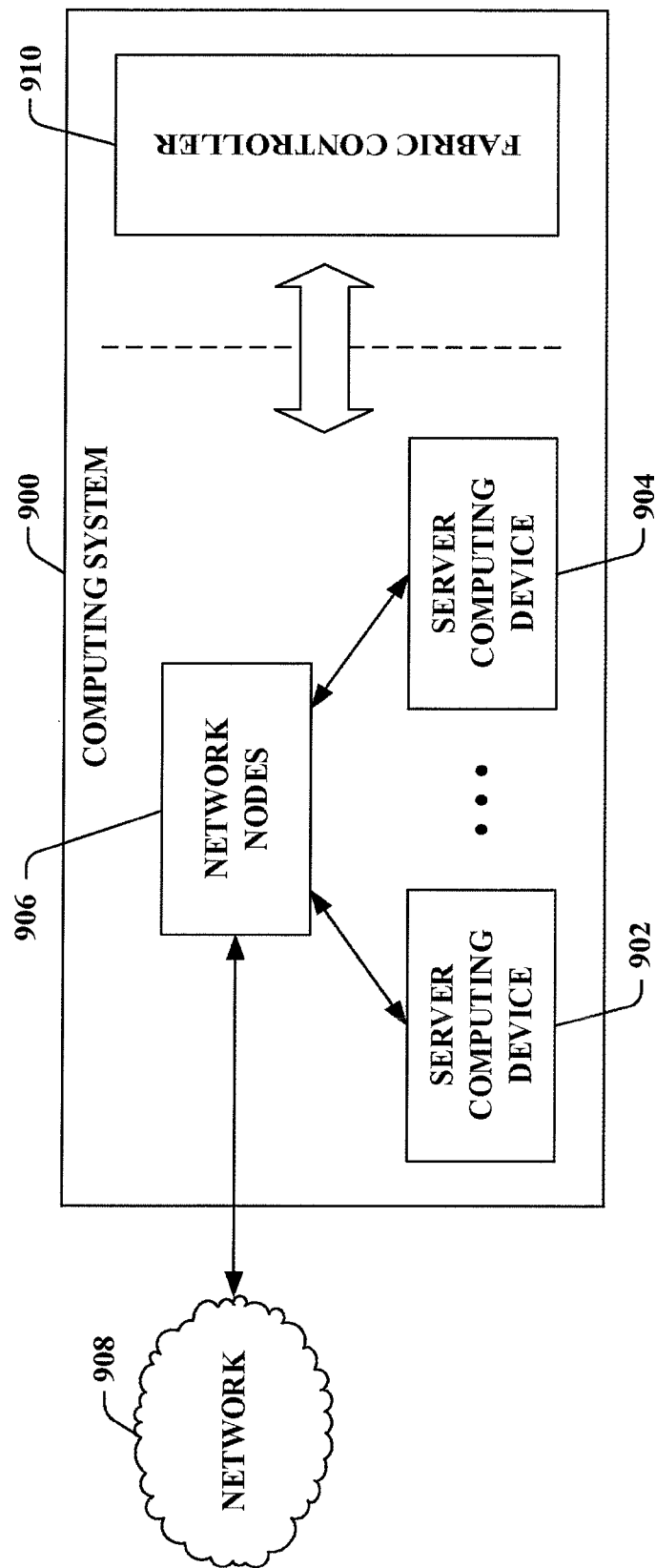
FIG. 9 depicts a high-level illustration of an exemplary computing system that may be used in accordance with the systems, methods, and computer-readable media disclosed herein, according to embodiments of the present disclosure.

Turning to FIG. 9, FIG. 9 depicts a high-level illustration of an exemplary computing system 900 that may be used in accordance with the systems, methods, and computer-readable media disclosed herein, according to embodiments of the present disclosure. For example, the computing system 900 may be or may include the computing system 102. Additionally, and/or alternatively, the computing system 102 may be or may include the computing system 900.

The computing system 900 may include a plurality of server computing devices, such as a server computing device 902 and a server computing device 904 (collectively referred to as server computing devices 902-904). The server computing device 902 may include at least one processor and a memory; the at least one processor executes instructions that are stored in the memory. The instructions may be, for example, instructions for implementing functionality described as being carried out by one or more components discussed above or instructions for implementing one or more of the methods described above. Similar to the server computing device 902, at least a subset of the server computing devices 902-904 other than the server computing device 902 each may respectively include at least one processor and a memory. Moreover, at least a subset of the server computing devices 902-904 may include respective data stores.

Processor(s) of one or more of the server computing devices 902-904 may be or may include the processor 104. Further, a memory (or memories) of one or more of the server computing devices 902-904 can be or include the memory 106. Moreover, a data store (or data stores) of one or more of the server computing devices 902-904 may be or may include the data store 118.

The computing system 900 may further include various network nodes 906 that transport data between the server computing devices 902-904. Moreover, the network nodes 906 may transport data from the server computing devices 902-904 to external nodes (e.g., external to the computing system 900) by way of a network 908. The network nodes 902 may also transport data to the server computing devices 902-904 from the external nodes by way of the network 908. The network 908, for example, may be the Internet, a cellular network, or the like. The network nodes 906 may include switches, routers, load balancers, and so forth.

A fabric controller 910 of the computing system 900 may manage hardware resources of the server computing devices 902-904 (e.g., processors, memories, data stores, etc. of the server computing devices 902-904). The fabric controller 910 may further manage the network nodes 906. Moreover, the fabric controller 910 may manage creation, provisioning, de-provisioning, and supervising of managed runtime environments instantiated upon the server computing devices 902-904.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Various functions described herein may be implemented in hardware, software, or any combination thereof. If implemented in software, the functions may be stored on and/or transmitted over as one or more instructions or code on a computer-readable medium. Computer-readable media may include computer-readable storage media. A computer-readable storage media may be any available storage media that may be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, may include compact disc ("CD"), laser disc, optical disc, digital versatile disc ("DVD"), floppy disk, and Blu-ray disc ("BD"), where disks usually reproduce data magnetically and discs usually reproduce data optically with lasers. Further, a propagated signal is not included within the scope of computer-readable storage media. Computer-readable media may also include communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio and microwave are included in the definition of communication medium. Combinations of the above may also be included within the scope of computer-readable media.

Alternatively, and/or additionally, the functionality described herein may be performed, at least in part, by one or more hardware logic components. For example, and without limitation, illustrative types of hardware logic components that may be used include Field-Programmable Gate Arrays ("FPGAs"), Application-Specific Integrated Circuits ("ASICs"), Application-Specific Standard Products ("ASSPs"), System-on-Chips ("SOCs"), Complex Programmable Logic Devices ("CPLDs"), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the scope of the appended claims.

What is claimed is:

1. A computer-implemented method for using managed runtime environment semantics to optimize record and replay frameworks, the method comprising:
   executing, by a computing system, a managed runtime component;
   interacting, by the computing system, with another system during the execution of the managed runtime component;
   determining, by the computing system, whether a non-deterministic event is to be logged in event logs during the execution of the managed runtime component;
   determining, by the computing system when the non-deterministic event is to be logged, whether semantics of the non-deterministic event to be logged include a predetermined semantic, wherein the predetermined semantic includes one or more of optimistic zero copy actions; and
   logging, by the computing system when the semantics of the non-deterministic event include the predetermined semantic, a copy of contents of the non-deterministic event in the event logs during the execution of the managed runtime component.

2. The method according to claim 1, wherein the one or more of optimistic zero copy actions includes an immutable semantic pointer save.

3. The method according to claim 1, wherein the one or more of optimistic zero copy actions includes a copy-on-write ("COW") semantic pointer save.

4. The method according to claim 1, wherein when the non-deterministic event having the semantics that include the one or more optimistic zero copy actions is on demand, values of the contents of the non-deterministic event are, on demand, copied into the event logs for storage or transmission.

5. The method according to claim 1, further comprising:
   recording, by the computing system, a sequence of snapshots of the managed runtime environment during the execution of the managed runtime component.

6. The method according to claim 5, further comprising:
   performing, by the computing system, time travel debugging by replaying at least a portion of the execution of the managed runtime component based at least in part on a snapshot from the sequence of snapshots and at least a portion of the event logs.

7. The method according to claim 5, further comprising:
   performing, by the computing system, automated failure root-cause analysis by replaying at least a portion of the execution of the managed runtime component based at least in part on a snapshot from the sequence of snapshots and at least a portion of the event logs.

8. The method according to claim 5, further comprising:
   performing, by the computing system, memory use analysis by replaying at least a portion of the execution of the managed runtime component based at least in part on a snapshot from the sequence of snapshots and at least a portion of the event logs.

9. A computing system for using managed runtime environment semantics to optimize record and replay frameworks, the system comprising:
   at least one processor; and
   memory comprising a managed runtime environment executable by the at least one processor, wherein the managed runtime environment, when executed by the at least one processor:
   executes a managed runtime component;
   interacts with another system during the execution of the managed runtime component;
   determines whether a non-deterministic event is to be logged in event logs during the execution of the managed runtime component;
   determines, when the non-deterministic event is to be logged, whether semantics of the non-deterministic event to be logged include a predetermined semantic, wherein the predetermined semantic includes one or more of optimistic zero copy actions; and
   logs, when the semantics of the non-deterministic event include the predetermined semantic, a copy of contents of the non-deterministic event in the event logs during the execution of the managed runtime component.

10. The system according to claim 9, wherein the one or more of optimistic zero copy actions includes an immutable semantic pointer save.

11. The system according to claim 9, wherein the one or more of optimistic zero copy actions includes a copy-on-write ("COW") semantic pointer save.

12. The system according to claim 9, wherein when the non-deterministic event having the semantics that include the one or more optimistic zero copy actions is on demand, values of the contents of the non-deterministic event are, on demand, copied into the event logs for storage or transmission.

13. The system according to claim 9, wherein the managed runtime environment, when executed by the at least one processor further:
   records a sequence of snapshots of the managed runtime environment during the execution of the managed runtime component.

14. The system according to claim 13, wherein the managed runtime environment, when executed by the at least one processor further:
   performs time travel debugging by replaying at least a portion of the execution of the managed runtime component based at least in part on a snapshot from the sequence of snapshots and at least a portion of the event logs.

15. The system according to claim 13, wherein the managed runtime environment, when executed by the at least one processor further:
   performs automated failure root-cause analysis by replaying at least a portion of the execution of the managed runtime component based at least in part on a snapshot from the sequence of snapshots and at least a portion of the event logs.

16. The system according to claim 13, wherein the managed runtime environment, when executed by the at least one processor further:
   performs memory use analysis by replaying at least a portion of the execution of the managed runtime component based at least in part on a snapshot from the sequence of snapshots and at least a portion of the event logs.

17. A non-transitory computer-readable medium storing instructions that, when executed by a computing system, cause the computing system to perform a method for using managed runtime environment semantics to optimize record and replay frameworks, the method including:
   executing, by the computing system, a managed runtime component;
   interacting, by the computing system, with another system during the execution of the managed runtime component;

determining, by the computing system, whether a non-deterministic event is to be logged in event logs during the execution of the managed runtime component;

determining, by the computing system when the non-deterministic event is to be logged, whether semantics of the non-deterministic event to be logged include a predetermined semantic, wherein the predetermined semantic includes one or more of optimistic zero copy actions; and logging, by the computing system when the semantics of the non-deterministic event include the predetermined semantic, a copy of contents of the non-deterministic event in the event logs during the execution of the managed runtime component.

18. The computer-readable medium of claim 17, wherein the one or more of optimistic zero copy actions includes an immutable semantic pointer save.

19. The computer-readable medium of claim 17, wherein the one or more of optimistic zero copy actions includes a copy-on-write ("COW") semantic pointer save.

20. The computer-readable medium of claim 17, wherein when the non-deterministic event having the semantics that include the one or more optimistic zero copy actions is on demand, values of the contents of the non-deterministic event are, on demand, copied into the event logs for storage or transmission.

* * * * *